(12) United States Patent
Aoki et al.

(10) Patent No.: US 9,025,008 B2
(45) Date of Patent: May 5, 2015

(54) STEREOSCOPIC IMAGE CAPTURING APPARATUS

(75) Inventors: Sunao Aoki, Kanagawa (JP); Masahiro Yamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 706 days.

(21) Appl. No.: 13/399,934

(22) Filed: Feb. 17, 2012

(65) Prior Publication Data

US 2012/0218387 A1    Aug. 30, 2012

(30) Foreign Application Priority Data

Feb. 25, 2011   (JP) ................. 2011-039557

(51) Int. Cl.
H04N 13/02         (2006.01)
G03B 35/10         (2006.01)

(52) U.S. Cl.
CPC ....... *H04N 13/0296* (2013.01); *H04N 13/0239* (2013.01); *H04N 13/0242* (2013.01); *G03B 35/10* (2013.01)

(58) Field of Classification Search
CPC ............................................... H04N 13/0239
USPC ......................................................... 348/47
See application file for complete search history.

(56) References Cited

U.S. PATENT DOCUMENTS 8,639,109 B2 * 1/2014 Aoki et al. ................. 396/325
8,773,511 B2 * 7/2014 Devigon ....................... 348/47

2010/0259600 A1    10/2010 Yoshikawa
2012/0113509 A1 *  5/2012 Yamada et al. .............. 359/462
2012/0201528 A1 *  8/2012 Aoki et al. .................. 396/325
2012/0249748 A1 * 10/2012 Nagano ........................ 348/47

FOREIGN PATENT DOCUMENTS

DE    43 40 461      6/1995
EP    2 485 496      8/2012
JP    2003-5313      1/2003

OTHER PUBLICATIONS

Search Report issued in corresponding European application No. 12152819.4 dated Jun. 16, 2014.

* cited by examiner

*Primary Examiner* — Sath V Perungavoor
*Assistant Examiner* — James Pontius
(74) *Attorney, Agent, or Firm* — Frommer Lawrence & Haug LLP; William S. Frommer

(57) ABSTRACT

A stereoscopic image capturing apparatus includes an objective optical system that has a function of forming a subject as a real image or an imaginary image, a plurality of image forming optical systems that respectively form a plurality of subject light beams emitted from different paths of the objective optical system as parallax images again, using a plurality of independent optical systems, a plurality of imaging devices that convert the parallax images formed by the plurality of image forming optical system into image signals, and a control unit that adjusts a formation position of a convergence point such that a ratio of a focal length of the objective optical system and a distance in an optical axis direction of the objective optical system between a focal point of the objective optical system and a primary principal point of the image forming optical system is substantially constant.

10 Claims, 12 Drawing Sheets

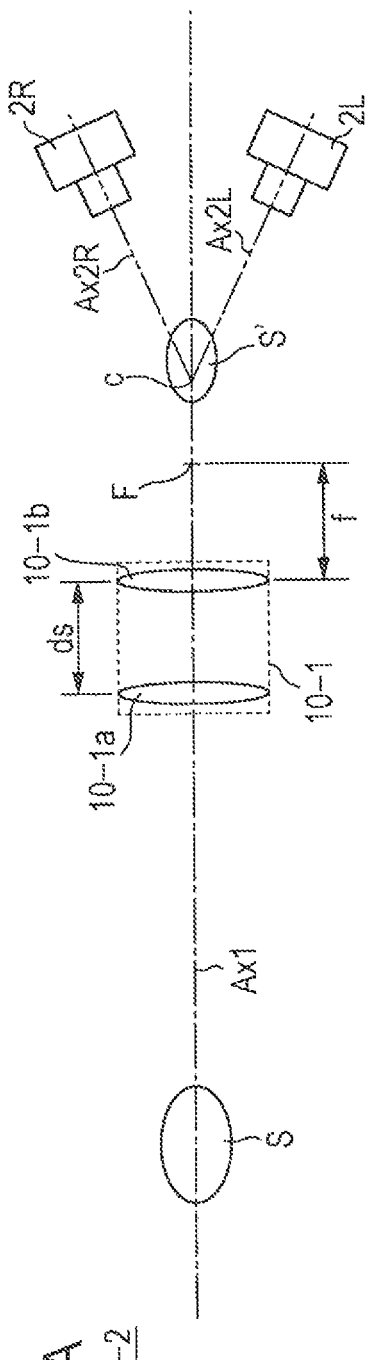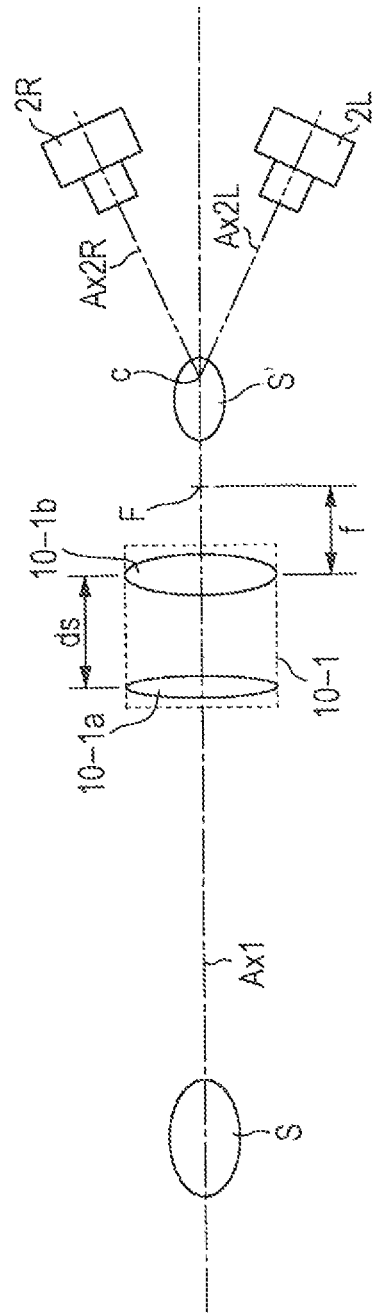

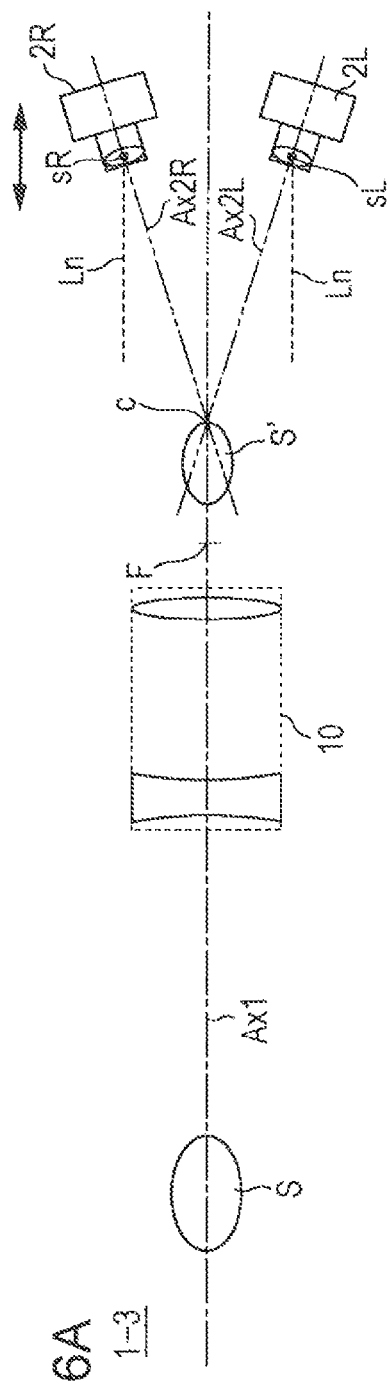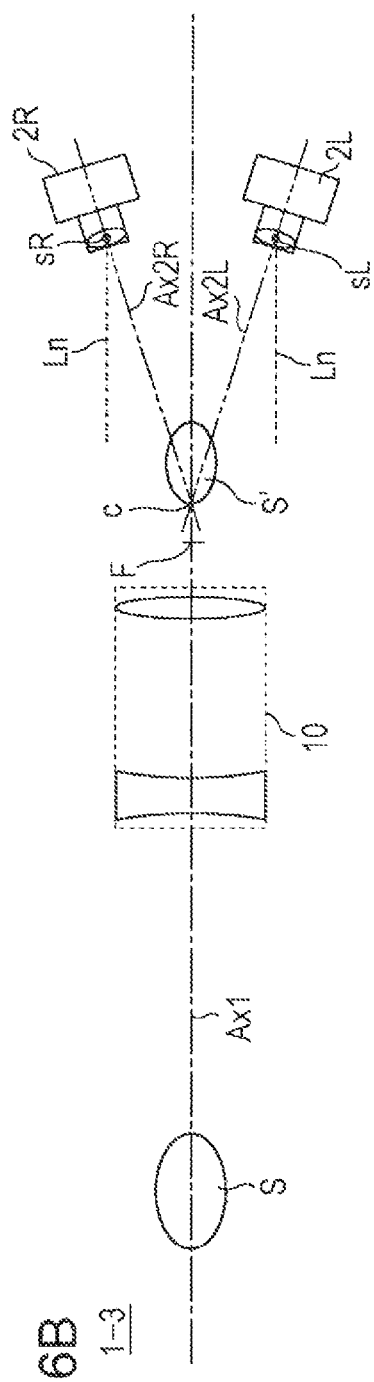

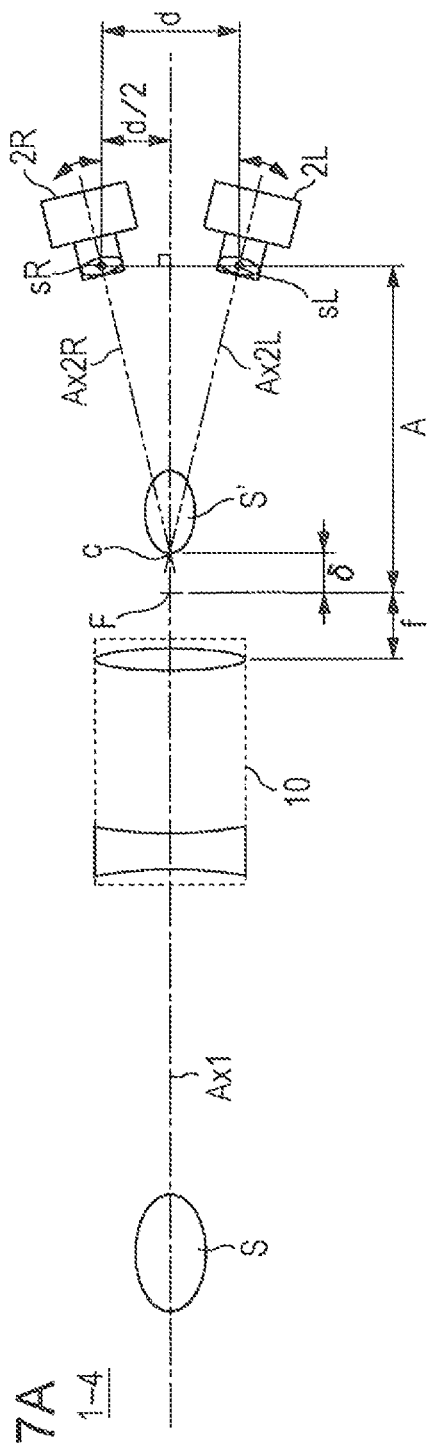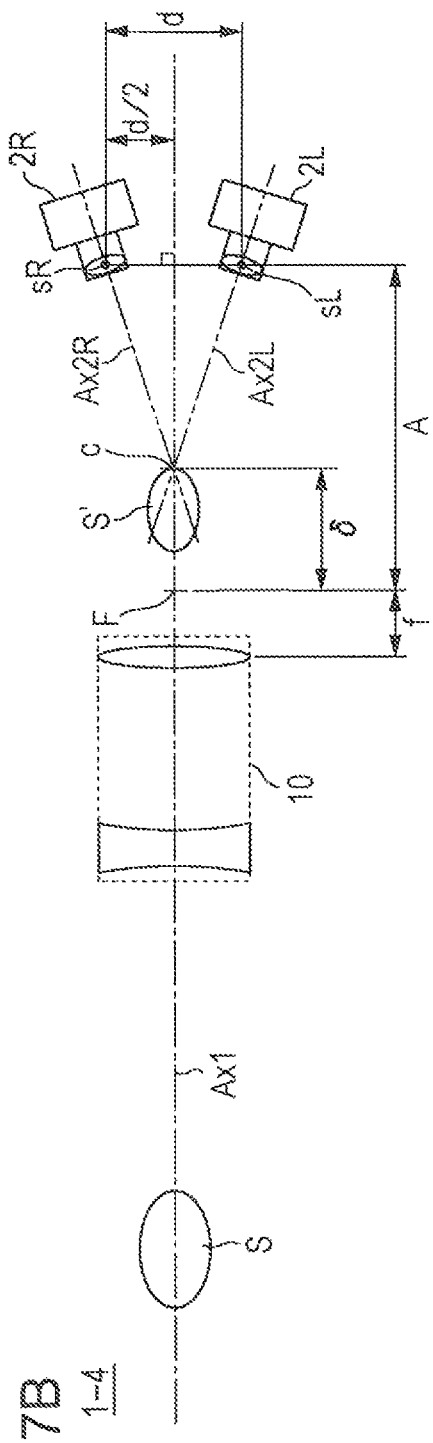

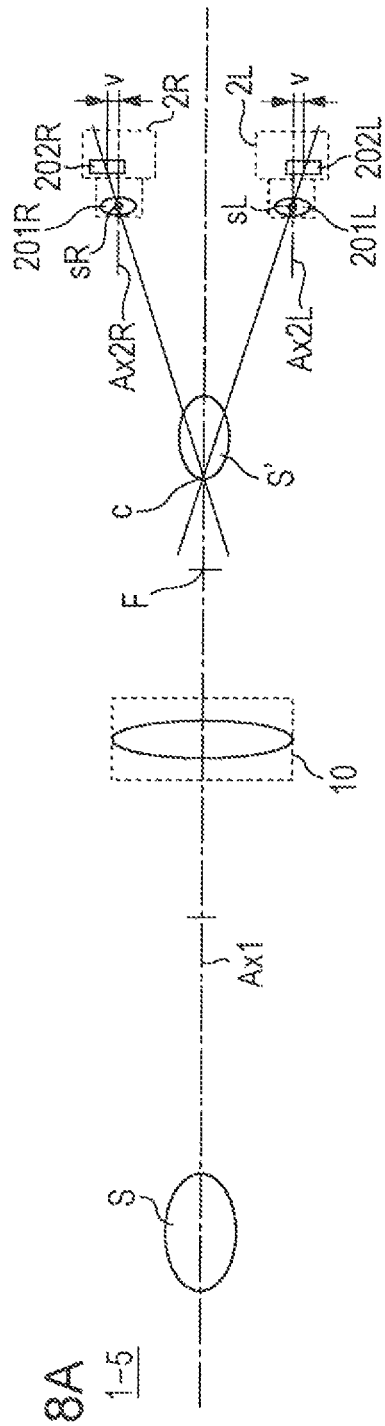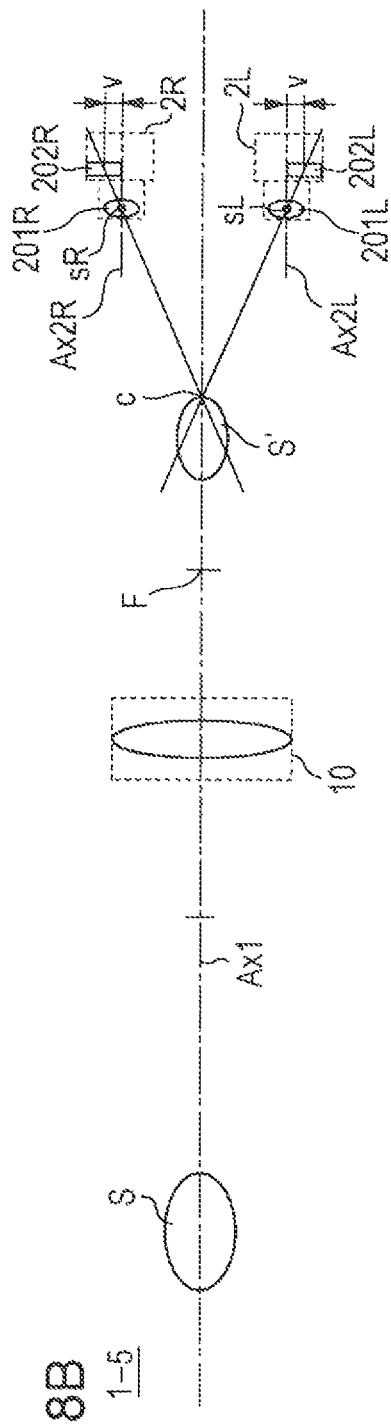

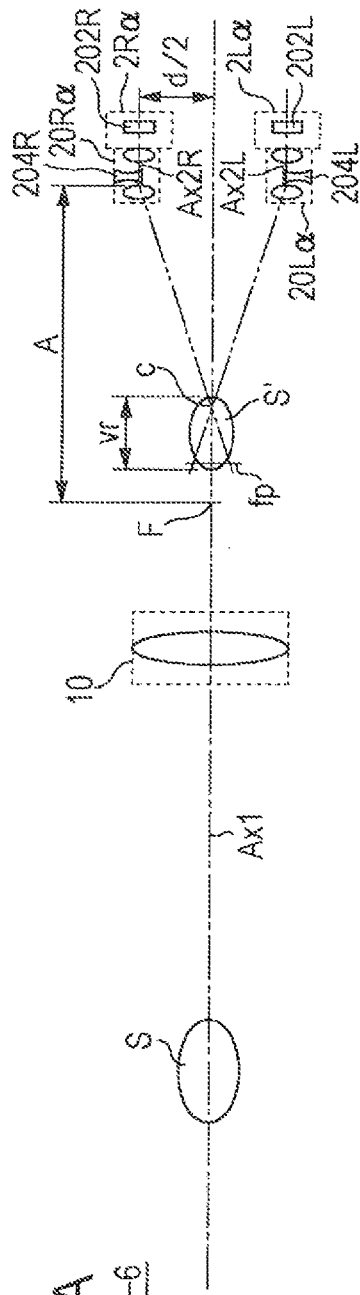
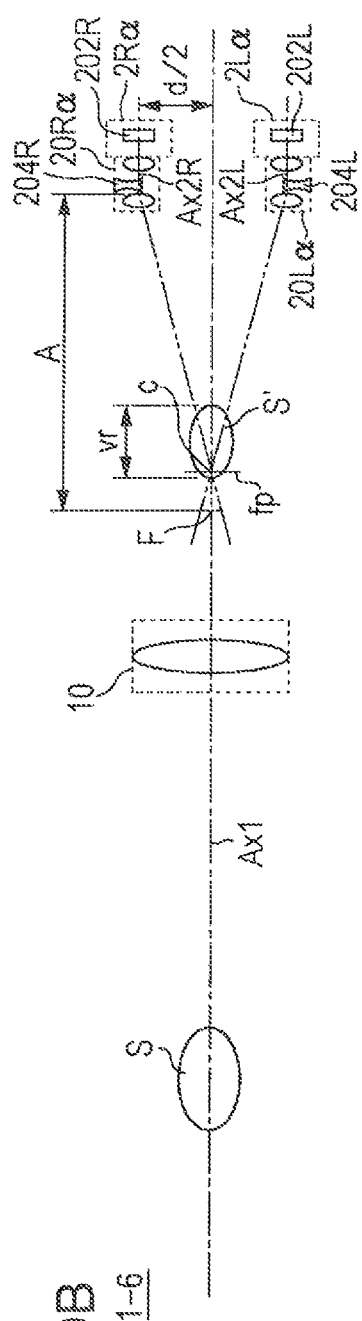
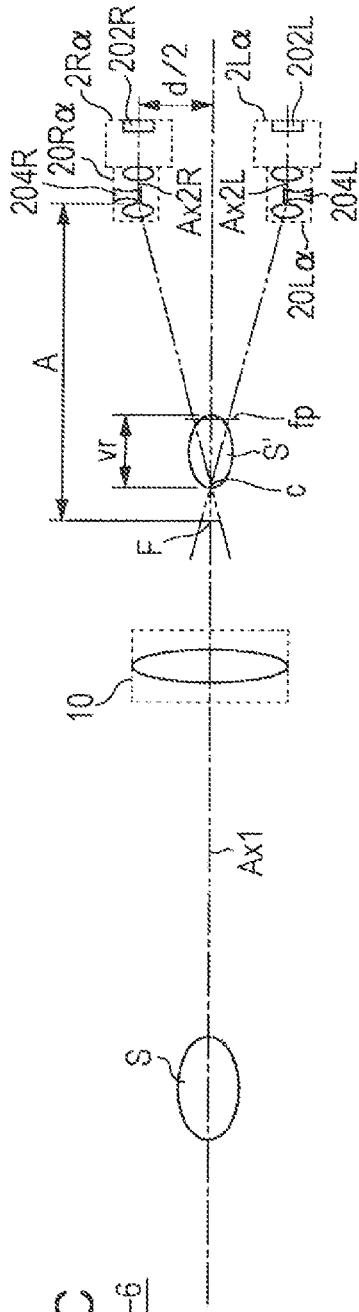

STEREOSCOPIC IMAGE CAPTURING APPARATUS

BACKGROUND

The present disclosure relates to a stereoscopic image capturing apparatus which captures stereoscopic images, and more particularly to a focus adjustment technique when stereoscopic images are captured.

In recent years, there has been increasing demand for cameras (stereoscopic image capturing apparatuses) capable of capturing 3D (stereoscopic) images. As methods of capturing stereoscopic images, there have been used a beam splitter type (half mirror type) of capturing images using a half mirror, a side-by-side type (parallel two-lens type) of capturing images using two imaging apparatuses which are physically arranged and installed, and the like. In these types, the imaging apparatuses are mounted on a cradle called a rig and photographing is performed, and thus the degree of freedom of installation of the imaging apparatuses is increased. For example, a distance between two lenses (hereinafter, referred to as an IAD (Inter Axial Distance)) capturing stereoscopic images, convergence, or an angle view can be selected with a high degree of freedom.

However, there is a problem in that whereas the degree of freedom is high, great effort and time are necessary for settings and adjustments for each photographing in order to mount the stereoscopic image capturing apparatuses on the rig. In addition, there is also a problem in that particularly the beam splitter type rig is a large-scale device, and is not suitable for photographing or coverage in the field.

In order to solve the problems, there are cases where a so-called integrated two-lens 3D camera is manufactured in which two 2D image capturing cameras which perform photographing in the side-by-side type are assembled into one casing. In the integrated two-lens 3D camera manufactured in this way, assembly is not necessary, and alignment adjustment (optical axis adjustment of the left and right cameras) is not also necessary. Further, since the integrated two-lens 3D camera is compact, it is advantageous in that it is easy to carry in the field when photographing or coverage is performed, and photographing can be performed with a short setup time.

However, the integrated two-lens 3D camera basically employs the side-by-side type, and thus there is a limitation on adjustment of an IAD. In other words, since the respective optical systems or imagers of the two lenses physically interfere with each other, the IAD may not be shorter than a specific distance defined by arrangement positions of the optical systems or imagers. For this reason, for example, in a case of very near photographing of a subject, since a parallax amount of a background image located on the rear side of the subject is excessive even if a parallax amount is adjusted to zero by matching convergence to the subject, the parallax amount exceeds a parallax range where people view 3D images with comfort.

As the case where a distance between the subject and the stereoscopic image capturing apparatus is very short, for example, there may be a case of interview photographing of a figure, a case of photographing in the background in the sports relay, or the like. In this case, a distance between the subject and the imaging apparatus is about 1 to 2 m, and a convergence point is also adjusted to a distance of about 1 to 2 m. In this case, it is said that the most useful IAD for putting parallax in a range where people can view 3D image with comfort is 10 mm to 40 mm. However, in the integrated two-lens 3D camera at present, it is difficult to realize such a short IAD while maintaining image quality or functions, that is, without reducing a lens diameter or an imager size.

In a case of performing photographing using the beam splitter type, two imaging apparatuses do not physically interfere with each other, and thereby it is possible to much shorten an IAD. As described above, however, there is the problem in that great efforts and time are necessary for settings and adjustments for each photographing, and thus there remains the problem in terms of not being suitable for interview photographing of a figure, or photographing in the backyard in the sports relay.

For'example, Japanese Unexamined Patent Application Publication No. 2003-5313 discloses a stereoscopic image capturing apparatus where a convergence point can be adjusted to any position in a state where a focal point of a camera is matched with the convergence point of two lenses. If this apparatus is used, photographing can be performed with an IAD equal to the pupil distance of a person, and thus it is possible to capture images where a natural stereoscopic effect can be obtained even in a case of near photographing.

SUMMARY

However, when reviewing the contents disclosed in Japanese Unexamined Patent Application Publication No. 2003-5313, it is considered that an objective optical system is provided, and thereby a virtual pupil corresponding to a pupil of an image forming optical system is formed further on a subject side (object side) than the pupil of the image forming optical system. The virtual pupil is a point through which, of light beams emitted from the subject, all the light beams passing through the objective optical system and passing through a lens center of the image forming optical system pass. In other words, an image formed in an imaging device of the image forming optical system is an image equivalent to an image which is captured using the virtual pupil as a pupil (hereinafter, the virtual pupil is referred to as an "effective pupil"). Therefore, it can be said that a distance between two effective pupils is a substantial IAD (hereinafter, referred to as an effective IAD) of the stereoscopic image capturing apparatus.

The effective IAD is varied depending on values of parameters such as a focal length of the objective optical system, or a distance between a secondary principal point of the objective optical system and a primary principal point of the image forming optical system. In addition, in a case where the effective IAD is considerably varied, a parallax amount in parallax images obtained by the stereoscopic image capturing apparatus is also considerably varied. Japanese Unexamined Patent Application Publication No. 2003-5313 discloses a method for adjusting a stereoscopic effect of images but does not disclose the concept of the effective IAD originally. Therefore, Japanese Unexamined Patent Application Publication No. 2003-5313 also does not disclose a method for adjusting a formation position of a convergence point so as not to vary the effective IAD considerably. For this reason, in a case where a convergence position is adjusted by the method disclosed in Japanese Unexamined Patent Application Publication No. 2003-5313, there is a possibility that the effective IAD may be considerably varied due to the adjustment. In other words, there is a possibility that stereoscopic images may be captured where a stereoscopic effect of the images is considerably varied during viewing and viewers feel discomfort.

It is desirable to adjust a formation position of a convergence point without almost varying a gap between virtual pupils formed by a stereoscopic image capturing apparatus.

According to an embodiment of the present disclosure, there is provided a stereoscopic image capturing apparatus including an objective optical system that has a function of forming a subject as a real image or an imaginary image; a plurality of image forming optical systems that respectively form a plurality of subject light beams emitted from different paths of the objective optical system as parallax images again, using a plurality of independent optical systems; and a plurality of imaging devices that are installed so as to correspond to the plurality of image forming optical systems and convert the parallax images formed by the plurality of image forming optical system into image signals. In addition, a formation position of a convergence point is adjusted by varying a relative arrangement position of the objective optical system with respect to arrangement positions of the image forming optical systems and/or the imaging devices, or relative arrangement positions of the image forming optical systems and/or the imaging devices with respect to an arrangement position of the objective optical system. The convergence point is formed at a position where optical axes of the plurality of image forming optical systems intersect each other or a position where lines connecting primary principal points of the plurality of image forming optical systems to centers of the imaging devices intersect each other. The formation position of the convergence point is adjusted such that a ratio of a focal length of the objective optical system and a distance in an optical axis direction of the objective optical system between a focal point of the objective optical system and a primary principal point of the image forming optical system is substantially constant, in a distance in the optical axis direction of the objective optical system between a secondary principal point of the objective optical system and the primary principal point of the image forming optical system.

With such configuration and control, even in a case of varying the formation position of the convergence point, a ratio of the focal length of the objective optical system to a distance between the secondary principal point of the objective optical system and the primary principal point of the image forming optical system, which is a parameter for defining a gap between virtual pupils, is not varied.

According to the embodiments of the present disclosure, it is possible to adjust a convergence position whilst hardly varying a gap between virtual pupils.

BRIEF DESCRIPTION OF THE DRAWINGS

FIG. 4A shows an example where the objective optical system is disposed at a position close to the imaging units, and FIG. 4B shows an example where the objective optical system is moved so as to become distant from the imaging units at the position shown in FIG. 4A.

FIGS. 5A and 5B are schematic diagrams illustrating a configuration example of the stereoscopic image capturing apparatus according to a second embodiment of the present disclosure, where FIG. 5A shows an example where a curvature radius of the variable focal point optical element is great, and FIG. 5B shows an example where a curvature radius of the variable focal point optical element is varied to be smaller than that shown in FIG. 5A.

FIGS. 6A and 6B are schematic diagrams illustrating a configuration example of the stereoscopic image capturing apparatus according to a third embodiment of the present disclosure, where FIG. 6A shows an example where the imaging units are disposed at such a position where a convergence point is formed at the rearmost of a spatial image, and FIG. 6B shows an example where the imaging units are moved to the front side from the position shown in FIG. 6A.

FIGS. 7A and 7B are schematic diagrams illustrating a configuration example of the stereoscopic image capturing apparatus according to a fourth embodiment of the present disclosure, where FIG. 7A shows an example where the imaging units are disposed at such an angle where a convergence point is formed at the frontmost of the spatial image, and FIG. 7B shows an example where the imaging units are tilted further in a direction separated from the optical axis of the objective optical system than the angle shown in FIG. 7A.

FIGS. 8A and 8B are schematic diagrams illustrating a configuration example of the stereoscopic image capturing apparatus according to a fifth embodiment of the present disclosure, where FIG. 8A shows an example where a shift amount from the optical axis of the image forming optical system in the arrangement of the imaging devices is reduced, and FIG. 8B shows an example where a shift amount from the optical axis of the image forming optical system is made to be greater than the amount shown in FIG. 8A.

FIGS. 9A to 9C are schematic diagrams illustrating a configuration example of the stereoscopic image capturing apparatus according to a sixth embodiment of the present disclosure, where FIG. 9A shows an example where the convergence angle varying lenses are shifted to a position separated from the optical axis of the image forming optical system, FIG. 9B shows an example where the convergence angle varying lenses are shifted further toward the optical axis of the objective optical system than the position shown in FIG. 9A, and FIG. 9C shows an example where the imaging devices are moved from the positions shown in FIGS. 9A and 9B in a direction distant from the image forming optical system.

DETAILED DESCRIPTION OF EMBODIMENTS

Hereinafter, embodiments of the present disclosure will be described. The description will be made in the following order.

1. CONFIGURATION EXAMPLE OF STEREOSCOPIC IMAGE CAPTURING APPARATUS

2. EFFECTIVE PUPIL FORMED BY STEREOSCOPIC IMAGE CAPTURING APPARATUS

3. METHOD OF ADJUSTING CONVERGENCE POSITION AND/OR FOCUS POSITION WITHOUT ALMOST VARYING EFFECTIVE IAD

4. FIRST EMBODIMENT (EXAMPLE WHERE CONVERGENCE POSITION IS ADJUSTED BY MOVING OBJECTIVE OPTICAL SYSTEM IN OPTICAL AXIS DIRECTION)

5. SECOND EMBODIMENT (EXAMPLE WHERE VARIABLE FOCAL POINT OPTICAL ELEMENT IS USED IN LENS OF OBJECTIVE OPTICAL SYSTEM AND CONVERGENCE POSITION IS ADJUSTED USING FOCAL LENGTH VARYING FUNCTION THEREOF)

6. THIRD EMBODIMENT (EXAMPLE WHERE CONVERGENCE POSITION IS ADJUSTED BY MOVING OVERALL IMAGING UNITS)

7. FOURTH EMBODIMENT (EXAMPLE WHERE CONVERGENCE POSITION IS ADJUSTED BY CONTROLLING ORIENTATION OF IMAGING UNITS)

8. FIFTH EMBODIMENT (EXAMPLE WHERE POSITIONS OF IMAGING DEVICES ARE SHIFTED WITH RESPECT TO LENS POSITION OF IMAGE FORMING OPTICAL SYSTEM, AND THEN CONVERGENCE POSITION IS ADJUSTED BY MOVING ONLY POSITIONS OF IMAGING DEVICES)

9. SIXTH EMBODIMENT (EXAMPLE OF CONFIGURATION WHERE CONVERGENCE POINT IS ADJUSTED USING LENS CAPABLE OF VARYING CONVERGENCE ANGLE, AND FOCUS POSITION IS ADJUSTED BY MOVING POSITIONS OF IMAGING DEVICES)

10. MODIFIED EXAMPLES OF FIRST TO SIXTH EMBODIMENTS

1. Configuration Example of Stereoscopic Image Capturing Apparatus

Figure 1:
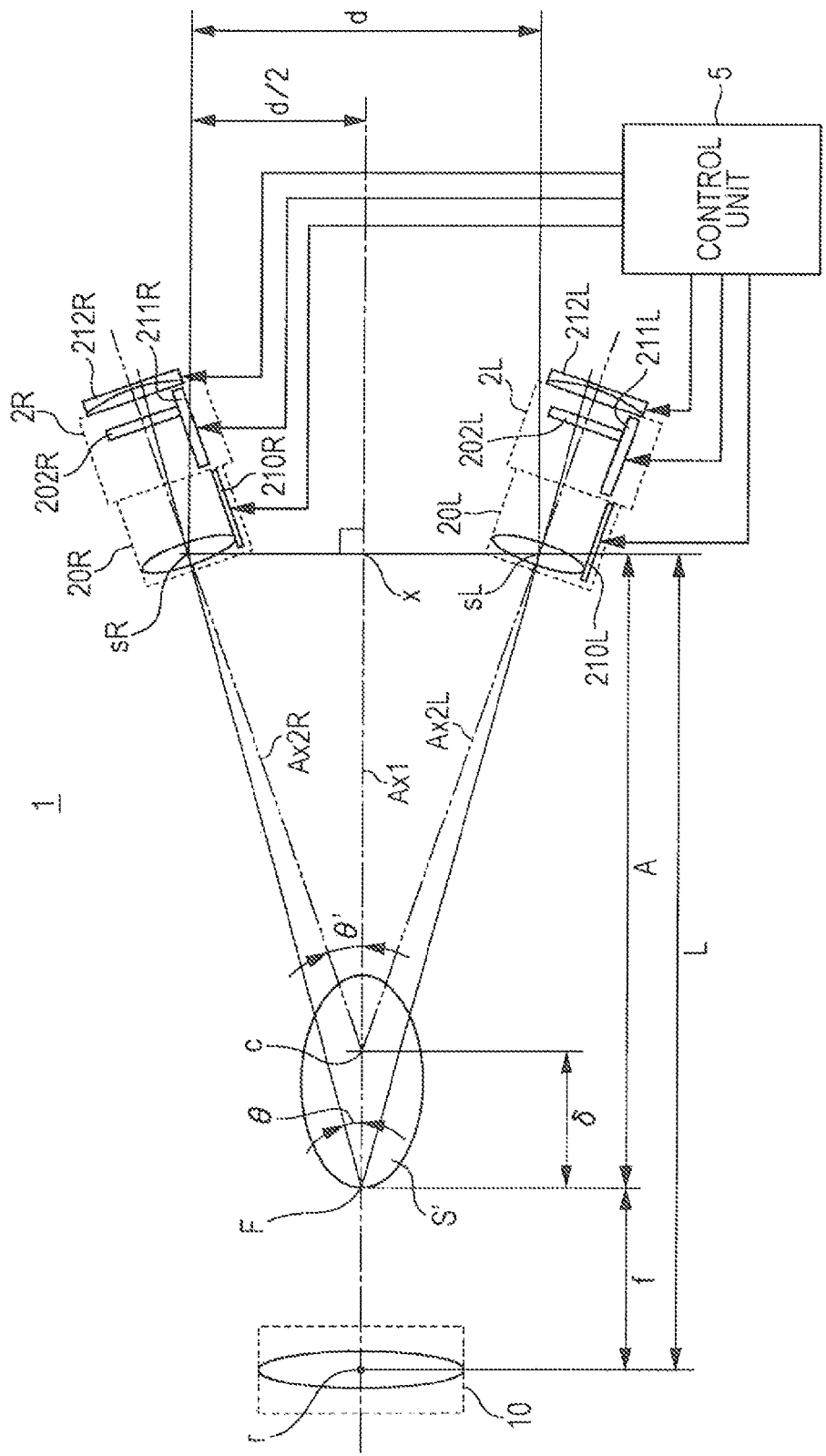
FIG. 1 is a schematic diagram illustrating an outline of the stereoscopic image capturing apparatus according to an embodiment of the present disclosure.

FIG. 1 shows a configuration example of the stereoscopic image capturing apparatus 1 according to an embodiment of the present disclosure. First, a basic configuration of the stereoscopic image capturing apparatus 1 common to the first to fourth embodiments described below will be described with reference to the stereoscopic image capturing apparatus 1 shown in FIG. 1. The stereoscopic image capturing apparatus 1 shown in FIG. 1 includes an objective optical system 10, and two imaging units 2R and 2L. The objective optical system 10 has a function of forming a subject S (not shown) as a real image. The imaging units 2R and 2L form images of a plurality of subject light beams emitted from different positions of the objective optical system 10 as parallax images again, and convert the formed images into image signals. The imaging unit 2R includes an image forming optical system 20R and an imaging device 202R, and the imaging unit 2L includes an image forming optical system 20L and an imaging device 202L.

In addition, in the example shown in FIG. 1, for convenience of description, the objective optical system 10 is a thin lens with a focal length f. The objective optical system 10 is actually constituted by a plurality of or a plurality of groups of lenses, filters, diaphragms, lens driving mechanisms, and the like. In addition to the mechanisms, a zoom function, a focusing function, and other functions may be included. The image forming optical systems 20R and 20L are also actually constituted by a plurality of or a plurality of groups of lenses, filters, diaphragms, lens driving mechanisms such as a motor, and the like, and may have a zoom function, a focusing function, and other functions.

In the configuration shown in FIG. 1, the objective optical system 10 and the image forming optical systems 20R and 20L are disposed such that the optical axis $Ax1$ of the objective optical system 10, the optical axis $Ax2R$ of the image forming optical system 20R, and the optical axis $Ax2L$ of the image forming optical system 20L are present on the same plane. The imaging unit 2R and the imaging unit 2L are disposed such that the optical axis $Ax2R$ of the image forming optical system 20R and the optical axis $Ax2L$ of the image forming optical system 20L intersect each other on the optical axis $Ax1$ of the objective optical system. In addition, the imaging unit 2R and the imaging unit 2L are disposed so as to symmetric to each other with the optical axis $Ax1$ of the objective optical system 10 interposed therebetween.

A point where the optical axis $Ax2R$ of the image forming optical system 20R and the optical axis $Ax2L$ of the image forming optical system 20L intersect each other on a spatial image S' is a convergence point c of the imaging unit 2 including each image forming optical system 20 and the corresponding imaging device 202. In the example shown in FIG. 1, the convergence point c is set at a position deviated from the focal point F of the objective optical system 10 by a distance δ. A positional relationship between the image forming optical system 20R (20L) and the imaging device 202R (202L) in the imaging unit 2R (2L) is assumed to be adjusted in advance to such a position where an image is optimally formed at the position of the convergence point c. In addition, in the following description, in a case where description through differentiation of left and right is not necessary such as arrangement or operation in the left (L) and the right (R) being the same for the respective configurations of the imaging units, description will be made using simple notations such as an imaging unit 2, an image forming optical system 20, an imaging device 202, a primary principal point s of the image forming optical system 20, and an optical axis $Ax2$.

In addition, the stereoscopic image capturing apparatus 1 includes a motor 210R (210L) driving lenses of the image forming optical system 20R (20L), and an imaging device position control unit 211R (211L) moving a position of the imaging device 202R (202L). In addition, the stereoscopic image capturing apparatus 1 includes a camera orientation control unit 212R (212L) varying the orientation of the imaging unit 2R (2L). Further, the stereoscopic image capturing apparatus 1 includes a control unit 5 which supplies control signals to the motors 210R and 210L for lens driving, the imaging device position control units 211R and 211L, and the camera orientation control units 212R and 212L. The stereoscopic image capturing apparatus 1 may include all the units, but may include minimal constituent elements according to the embodiments described later.

According to the stereoscopic image capturing apparatus 1 configured in this way, an image of the subject S at infinity is formed at the focal point F on the rear side of the objective optical system 10, and an image of the subject S is formed further on the rear side (the imaging devices 202R and 202L side) than the focal point F according to a distance from the objective optical system 10. In addition, for convenience of description, although a case where a real image is formed by the objective optical system 10 and the image forming optical systems 20R and 20L is described as an example, the present disclosure is not limited thereto.

2. Effective Pupil Formed by Stereoscopic Image Capturing Apparatus 1

Figure 2:
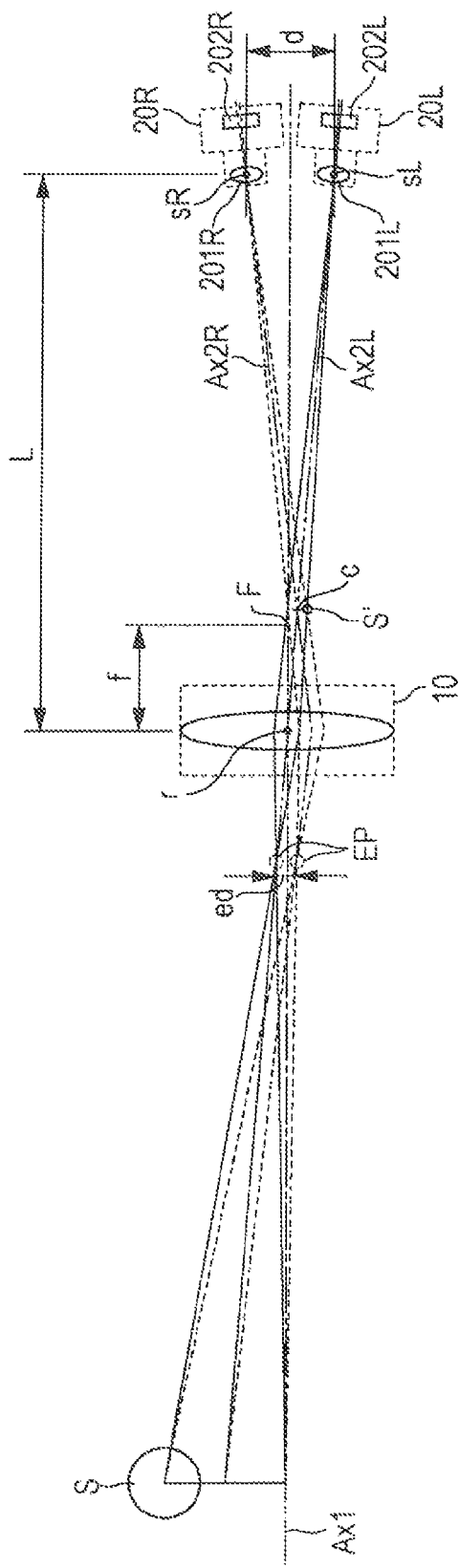
FIG. 2 is a diagram illustrating an effective pupil and an effective IAD formed by the stereoscopic image capturing apparatus according to the embodiment of the present disclosure.

Next, an effective pupil formed by the stereoscopic image capturing apparatus 1 will be described with reference to FIG. 2. FIG. 2 is a light path diagram illustrating paths which light beams passing through principal points of the lenses of the image forming optical systems 20R and 20L travel, of light beams radiated from the subject S. In FIG. 2, the light beams are indicated by three representative light beams radiated from three different positions of the subject S. The light beams passing through the primary principal point sR of the image forming optical system 20R are denoted by the broken lines, and the light beams passing through the primary principal point sL of the image forming optical system 20L are denoted by the solid lines.

The light beams radiated from the subject S pass through the objective optical system 10 and form an image between the objective optical system 10 and the image forming optical systems 20R and 20L. When viewed from the lenses of the image forming optical systems 20R and 20L, since it seems that an object exists at the position, an image at this position is referred to as a spatial image S'. The light beams passing through the position where the spatial image S' is formed are guided to the two image forming optical systems 20R and 20L, and form images on respective light sensing surfaces (not shown) of the imaging device 202R and the imaging device 202L, and the formed images respectively become parallax images.

In addition, if light beams are radiated from the centers of the lenses of the image forming optical systems 20R and 20L, the light beams radiated from the subject S travels the same path as the path which the light beams have traveled. This can be easily understood when thinking about the light beams radiated from the centers of the lenses of the image forming optical systems 20R and 20L. The light beams radiated from the centers of the lenses of the image forming optical systems 20R and 20L reach the lens of the objective optical system 10 after passing through a certain point on the spatial image S', and proceeds toward a certain point of the subject S corresponding to the "certain point on the subject S'". At this time, it can be seen that the light beams passing through the lens of the objective optical system 10 intersects again a certain point present between the lens and the subject S.

That is to say, it can be said that the one point is a point through which all the light beams passing through the lens centers of the image forming optical systems 20R and 20L pass. For this reason, images formed on an imaging surface of the imaging device 202R of the image forming optical system 20R and an imaging surface of the imaging device 202L of the image forming optical system 20L are equivalent to images which are captured using the "one point" as a substantial pupil. That is to say, the "one point" is considered as a substantial pupil (effective pupil EP) in the stereoscopic image capturing apparatus 1. Therefore, it can be said that a distance between the respective effective pupils EP formed by the left and right image forming optical systems 20R and 20L is a substantial IAD (hereinafter, referred to as an effective IAD) in the stereoscopic image capturing apparatus 1.

The effective IADed is expressed by the following Equation 1.

$$\text{Effective IADed} = f/(L-f) \times d \qquad \text{(Equation 1)}$$

In Equation 1, "f" is a focal length of the objective optical system 10, and "L" is a distance between the secondary principal point r of the objective optical system 10, and the primary principal point sR of the image forming optical system 20R and the primary principal point sL of the image forming optical system 20L in the optical axis Ax1 direction of the objective optical system 10. In addition, as shown in FIG. 2, if the lens of the objective optical system 10 is idealized as a thin lens, a primary principal point is not differentiated from a secondary principal point, and thus the primary principal point corresponds with the secondary principal point. "d" is a physical IAD (hereinafter, referred to as IADd) defined by arrangement positions of the image forming optical system 20R and the image forming optical system 20L.

For example, it is assumed that the focal length f of the objective optical system 10 is 70 mm, and the distance L is 370 mm. Further, it is assumed that the image forming optical system 20R and the image forming optical system 20L are disposed to be spaced apart from each other by the distance d=60 mm, with respect to the optical axis Ax1 of the objective optical system 10 which is a symmetric axis (IADd=60 mm). In this case, the effective IADed is calculated as 14 mm by Equation 1. That is to say, in the stereoscopic image capturing apparatus 1 according to the embodiment of the present disclosure, the effective IADed is f/(L-f) times shorter (14 mm) than the physical IADd (60 mm).

Therefore, if the focal length f and the distance L of the objective optical system 10 are set to values satisfying the following Equation 2, it is possible to make the effective IADed shorter than the physical IADd obtained by the arrangement positions of the image forming optical systems 20R and 20L. Further, the following Equation is based on the premise that a convex lens is used as the lens of the objective optical system 10, and a focal length f thereof is positive (f>0).

$$f/(L-f) \leq 1 \qquad \text{(Equation 2)}$$

3. Method of Adjusting Convergence Position (and/or Focus Position) without Varying Effective IAD Referring to FIG. 1 again, there will be made a description of a method of adjusting a position of the convergence point (hereinafter, also referred to as a convergence position) formed by the stereoscopic image capturing apparatus 1. An outline of the method of adjusting a convergence position (and/or a focus position) without varying the effective IAD will be described here, and detailed examples of the convergence position adjustment method will be described later as the first to sixth embodiments.

In FIG. 1, a distance (physical IAD) between the primary principal point sR and of the image forming optical system 20R and the primary principal point sL of the image forming optical system 20L is denoted by d, and an intersection between a perpendicular reaching the optical axis Ax1 of the objective optical system 10 from the primary principal point sR (sL) of the image forming optical system 20R (20L), and the optical axis Ax1, is denoted by an intersection x. In addition, a distance between the focal point F of the objective optical system 10 and the intersection x is denoted by A.

In addition, a line connecting the focal point F of the objective optical system 10 to the primary principal point sR (sL) of the lens of the image forming optical system 20R (20L) is denoted by the solid line, and an angle formed by the line and the optical axis Ax1 of the objective optical system 10 is denoted by θ. An angle formed by the optical axis Ax2R (Ax2L) of the image forming optical system 20R (20L) and the optical axis Ax1 of the objective optical system 10 is denoted by θ'.

It is assumed that positions of the primary principal point sR of the image forming optical system 20R and the primary principal point sL of the image forming optical system 20L are adjusted at positions where an optimal parallax amount can be obtained when the subject S located at a certain photographing distance is photographed. In other words, a physical IADd determined by a distance between the principal points of both the image forming optical systems is set at any distance. In this state, a case where a convergence position is adjusted to an arbitrary position on the spatial image S' will be described.

In a case where a formation position of the convergence point c is varied by varying the convergence angle θ' which is an angle formed by the optical axis Ax2R of the image forming optical system 20R and the optical axis Ax2L of the image forming optical system 20L, the following control is performed. Thereby, it is possible to change a convergence position without varying the effective IADed. That is to say, the angle θ' formed by the optical axis Ax2R (Ax2L) of the image forming optical system 20R (20L) and the optical axis Ax1 of the objective optical system 10 is adjusted to an angle satisfying the following Equation 3.

Angle θ'=arctan $(d/2(A-\delta))$ (Equation 3)

In addition, even if the convergence point c is adjusted to a desired position, there are cases where the effective IADed may be varied due to subsequent focus adjustment. In order not to vary the effective IADed, a control may be performed such that "tan θ=d/2A" is not varied due to focus adjustment. That is to say, focus adjustment may be performed such that a ratio of the length (d/2) of the perpendicular reaching the optical axis Ax1 of the objective optical system 10 from the primary principal point sR (sL) of the image forming optical system 20R (20L) and the length (distance A) from the intersection x between the optical axis Ax1 of the objective optical system 10 and the perpendicular to the focal point F of the objective optical system 10 is constant.

For example, if positions of the primary principal point sR of the image forming optical system 20R and the primary principal point sL of the image forming optical system 20L are fixed and then the focus adjustment is performed, the distance A or the length of the perpendicular d/2 is not varied. Alternatively, in a case of performing the focus adjustment by moving a position of the primary principal point sR (sL) of the image forming optical system 20R (20L), the movement is performed along a straight line connecting the focal point F of the objective optical system 10 to the primary principal point s of the image forming optical system 20. Thereby, it is possible to maintain "tan θ=d/2A" to be constant.

Figure 3:
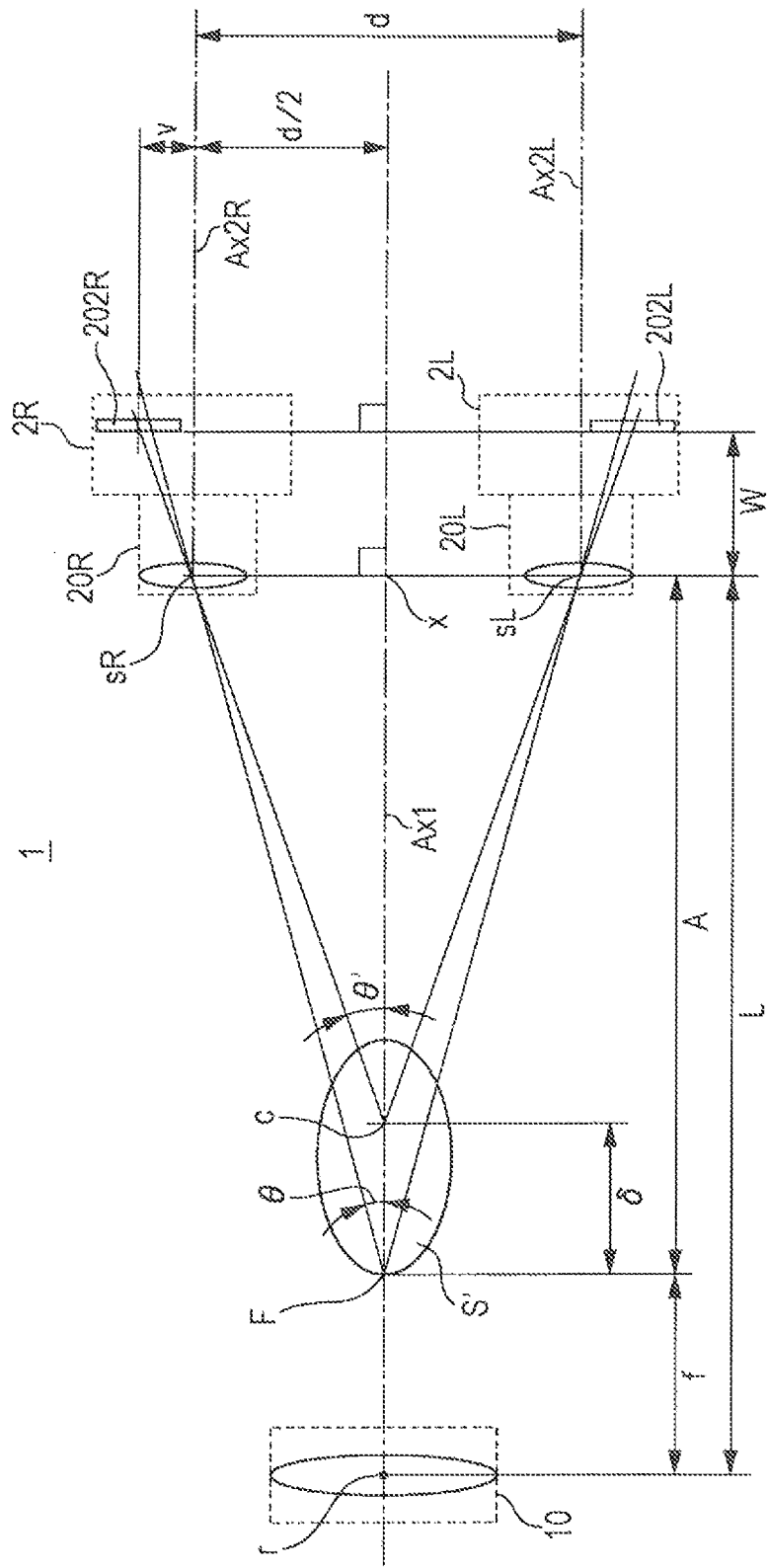
FIG. 3 is a schematic diagram illustrating a configuration example of the stereoscopic image capturing apparatus according to the embodiment of the present disclosure.

In addition, as shown in FIG. 3, in a case where the stereoscopic image capturing apparatus 1 is configured such that each optical axis Ax2 of each image forming optical system 20 is parallel to the optical axis Ax1 of the objective optical system 10 as well, a convergence position can be adjusted without varying the effective IADed (refer to FIG. 2) through the same control. The configuration shown in FIG. 3 is common to the fifth and sixth embodiments. In the configuration shown in FIG. 3, the lens of each image forming optical system 20 is disposed such that the main face of each image forming optical system 20 is perpendicular to the optical axis Ax1 of the objective optical system 10. In addition, each imaging device 202 is disposed in a state where the imaging surface thereof is perpendicular to the optical axis Ax1 of the objective optical system 10 and at a position where each image forming optical system 20 is shifted by a shift amount v from each optical axis Ax2 of each image forming optical system 20. The shift is performed in a direction distant from the optical axis Ax1 of the objective optical system 10.

In a case where the stereoscopic image capturing apparatus 1 is configured in this way, the convergence point c is formed at a position where light beams passing through the primary principal point sR of the image forming optical system 20R and the center of the imaging device 202R intersect light beams passing through the primary principal point sL of the image forming optical system 20L and the center of the imaging device 202L. Therefore, the adjustment of a convergence position through a variation in the convergence angle can be realized by, for example, adjusting a shift amount v of each imaging device 202. In this case, a control is performed such that the angle θ' formed by the light beams passing through the primary principal point sR (sL) of the image forming optical system 20R (20L) and the center of the imaging device 202R (202L) and the optical axis Ax1 of the objective optical system 10 satisfies the above Equation 3. Thereby, a convergence position can be varied without varying the effective IADed.

In the configuration shown in FIG. 3 as well, the effective IADed is varied as in the example shown in FIG. 1 in a case where the focus adjustment is performed after adjusting a convergence position. Therefore, in order not to vary the effective IADed, it is necessary to perform the focus adjustment by the following method.

In the configuration shown in FIG. 3, as a method of performing focus adjustment, for example, there may be used a method where a distance w which is a distance between the primary principal point s of each image forming optical system 20 and the imaging surface of the imaging device is varied by moving each imaging device 202. That is to say, a focus position is varied by moving each imaging device 202 on the line passing through the primary principal point s of the image forming optical system 20 and the center of the imaging device 202. At this time, if the movement of each imaging device 202 is performed in a state where a position of the primary principal point s of each image forming optical system 20 is fixed, the above-described "tan θ=d/2A" is not varied. In other words, it is possible to perform focus adjustment without varying the effective IADed.

In a case where adjustment of a convergence position through adjustment of the shift amount v of each imaging device 202 and focus adjustment through adjustment of the distance w are performed together, it is necessary to perform the adjustment after following a ratio of the shift amount v/the distance w. Specifically, first, the distance w and the shift amount v are calculated based on a distance δ, which is defined by a formation position of the convergence point c, from the focal point F of the objective optical system 10 to the convergence point c. In addition, each imaging device 202 is moved to a position defined by the distance w and the shift amount v. The distance w can be calculated using the following Equation 4.

$1/w=1/fr-1/(A-\delta)$ (Equation 4)

In Equation 4, "fr" denotes a focal length of each image forming optical system 20. In addition, Equation 4 is based on the premise of (A−δ)>fr. The distance δ is defined by determining a position on the spatial image S' where the convergence point c is desired to be formed. Further, by assigning the distance δ, the predefined distance A, and the distance d/2 to Equation 3, an angle θ' formed by the line passing through the principal point s of each image forming optical system 20 and the center of the imaging device 202, and the optical axis Ax1 of the objective optical system 10, is obtained. In addition, the shift amount v is obtained by multiplying the angle θ' by the distance w calculated by Equation 4. Each imaging device 202 is moved to a position defined based on the distance w and the shift amount v obtained in this way, and thereby it is possible to change a focus position and a convergence position together without varying the effective IADed.

In all the configurations shown in FIGS. 1 and 3, if the focus adjustment is to be performed, it is necessary to adjust the image forming optical system 20R and the image forming optical system 20L together such that the distance A in the image forming optical system 20R and the distance A in the image forming optical system 20L have the same value at all time. The focus adjustment (that is, in each image forming optical system 20) described here refers to an adjustment for moving an object face (focus face) in a finite distance range. That is to say, the focus adjustment refers to an adjustment in a range which can be performed not by all the optical systems including the objective optical system 10 but by the image forming optical system 20 (and/or the imaging device 202). This is common to the respective embodiments described later.

Next, a convergence position adjustment method performed by the stereoscopic image capturing apparatus 1 according to the embodiment of the present disclosure will be described. As methods of adjusting a convergence position, there may be largely two methods. One method is a method where a formation position on the spatial image S' of a convergence point set at a predetermined position is moved, and, as a result, a relative position of the convergence point with respect to the spatial image S' is varied. The other method is a method of varying a convergence position by varying a convergence angle. The former method is realized through the first to third embodiments described later, and the latter method is realized through the fourth to sixth embodiments described later.

4. First Embodiment( Example of Adjusting Convergence Position by Moving Objective Optical System in Optical Axis Direction Thereof)

Figure 4A:
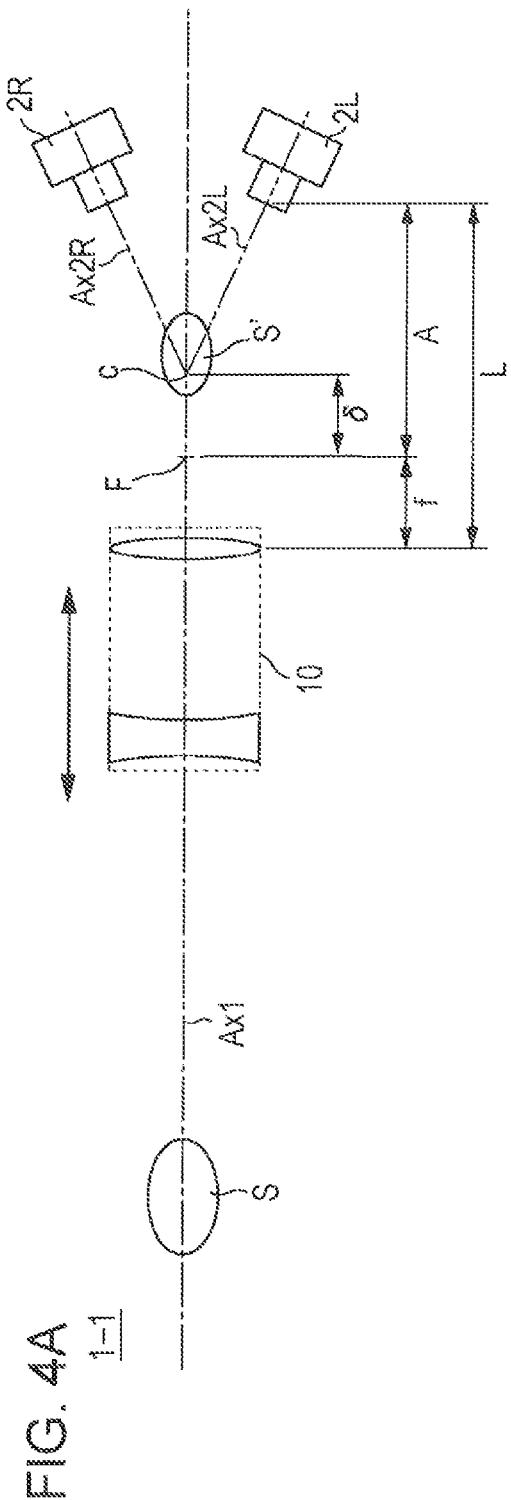
FIGS. 4A and 4B are schematic diagrams illustrating a configuration example of the stereoscopic image capturing apparatus according to a first embodiment of the present disclosure, where
Figure 4B:
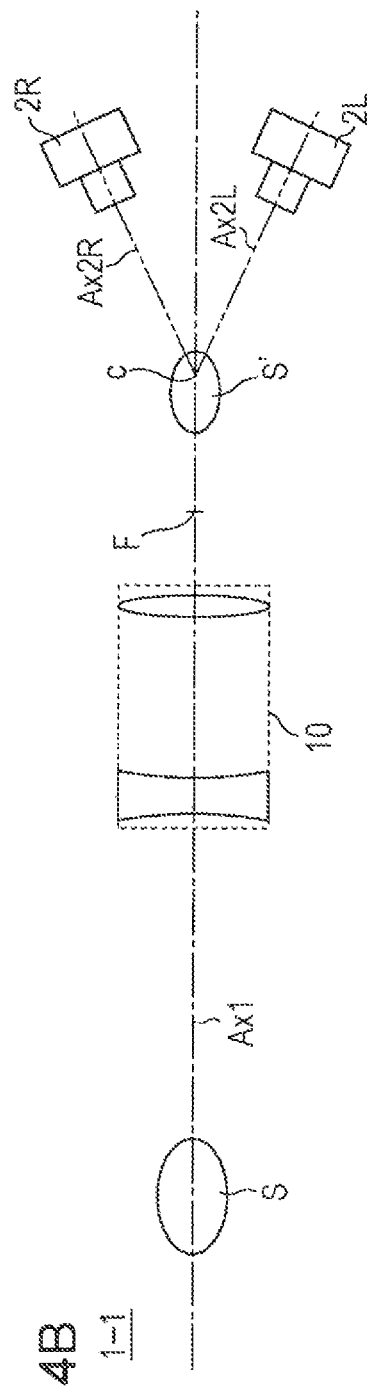

FIGS. 4A and 4B are schematic diagrams illustrating a configuration example of the stereoscopic image capturing apparatus 1-1 according to the first embodiment of the present disclosure. A configuration and an arrangement of the stereoscopic image capturing apparatus 1-1 are the same as those in shown in FIG. 1. That is to say, the stereoscopic image capturing apparatus 1-1 includes an objective optical system 10 and two imaging units 2R and 2L, and the imaging unit 2R and the imaging unit 2L are disposed at such a position where the optical axis Ax2R and the optical axis Ax2L of the two imaging units 2R and 2L intersect each other on a formation position of the spatial image S' on the optical axis Ax1 of the objective optical system. The intersection of the optical axes is formed at a position separated from the focal point F of the objective optical system 10 by a distance δ. An image formed at a position corresponding to the intersection on the spatial image S' is an image where binocular parallax is zero and is obtained by the left and right imaging units 2L and 2R. In other words, this intersection is a convergence point c of the imaging unit 2 including each image forming optical system 20 and the corresponding imaging device 202. The objective optical system 10 is constituted by a lens group including a concave lens and a convex lens. Details will be described later, and this configuration is employed for the purpose of shortening a focal length f of the objective optical system 10.

In addition, the arrangement of the stereoscopic image capturing apparatus 1-1 may be the arrangement as shown in FIG. 3. That is to say, each optical axis Ax2 of the image forming optical system 20 may be disposed so as to be parallel to the optical axis Ax1 of the objective optical system 10. In the embodiment, the stereoscopic image capturing apparatus 1-1 may be configured such that lines connecting the optical axes Ax2 of the respective image forming optical systems 20 or the primary principal points s of the respective image forming optical systems 20 to the centers of, the respective imaging devices 202 intersect each other on the optical axis Ax1 of the objective optical system 10. That is to say, the configuration and the like of each imaging unit 2 may employ any form.

Next, a convergence position adjustment operation performed by the stereoscopic image capturing apparatus 1-1 will be described with reference to FIGS. 4A and 4B. If a portion of lenses of the objective optical system 10 or the overall objective optical system 10 is moved in the direction of the optical axis Ax1 of the objective optical system 10, a formation position of the spatial image S' is moved on the optical axis Ax1 of the objective optical system 10 along therewith. For example, if the overall objective optical system 10 is moved toward the subject S (object side) (a lens barrel (not shown) of the objective optical system 10 extends), as shown in FIG. 4B, the formation position of the spatial image S' is also moved toward the object. If the arrangement of each imaging unit 2 including each image forming optical system 20 and each imaging device 202 corresponding to the image forming optical system 20 is not varied, a formation position of the intersection (the convergence point c) is not varied. For this reason, the formation position of the spatial image S' with respect to the convergence point c is moved toward the subject (object). In other words, the convergence point c is relatively moved to the rear side (exit side of light) with respect to the formation position of the spatial image S'.

That is to say, since the formation position of the spatial image S' is moved so as to track the extension operation of the objective optical system 10, it is possible to adjust a position where the convergence point c is formed (convergence position) to an arbitrary position on the spatial image S' by controlling an extension amount of the objective optical system 10. In addition, an extension amount of the objective optical system 10 is an amount sufficient to move the formation position of the spatial image S' in a range of the length in the depth direction of the spatial image S' formed by the objective optical system 10. For example, in a case of a lens having the focal length f of 50 mm, the spatial image S' can be moved to an arbitrary position with an extension amount of about 1 to 2 mm. That is to say, a convergence position can be adjusted to any position.

In the convergence position adjustment method according to the above-described first embodiment, strictly speaking, the effective IADed is slightly varied. This is because the "distance L" which is one of parameters defining the effective IADed is varied by the extension operation of the objective optical system 10. The "distance L" is, as described above, a distance between the intersection between the perpendicular reaching the optical axis Ax1 of the objective optical system 10 from the primary principal point of each image forming optical system 20 and the optical axis Ax1, and the focal point F of the objective optical system 10. The effective IADed can be calculated using the above Equation 1. However, when the convergence position is adjusted by the stereoscopic image capturing apparatus 1-1, an extension amount of the objective optical system 10 is about 1 to 2 mm, and thus influence on the effective IADed may be very small.

If influence of the convergence position adjustment on the effective IADed is intended to be smaller, the objective optical system 10 may be configured such that the focal length f is short. If the focal length f is short, the length in the depth direction of the spatial image S' can be made to be short, and thus it is possible to further reduce an extension amount of the lens of the objective optical system 10. Alternatively, photographing is performed after a photographing distance is lengthened in each imaging unit 2, and thereby it is possible to further decrease influence of variations in an extension amount on the distance L. In addition, if a lens where a position of the primary principal point s is hardly varied due to the focus adjustment is employed as the lens of the objective optical system 10, it is possible to change a formation position of the spatial image S' without varying the "distance L". The lens where a position of the primary principal point s is hardly varied due to the focus adjustment includes an inner focus type lens, a rear focus type lens, or the like.

According to the above-described first embodiment, it is possible to easily adjust a convergence position by moving the whole or a portion of the lenses of the objective optical system 10 (by the extension operation of the lens barrel). That is to say, it is possible to a convergence position to any position simply by performing an adjustment operation of an image forming position by the objective optical system 10.

In addition, according to the embodiment, since all or a portion of the lenses of the objective optical system 10 are moved, a convergence position and a focus position are varied together. Thereby, the number of steps necessary for settings when a photographer captures stereoscopic images can be reduced, and thus it is possible to easily capture stereoscopic images.

Further, according to the embodiment, since the overall or a portion of the lenses of the objective optical system 10 are moved, it is possible to adjust a convergence position to any position without varying a distance between the subject S and the imaging unit 2.

In addition, according to the embodiment, it is possible to adjust a convergence position whilst hardly varying the effective IADed. That is to say, it is possible to vary a convergence position without changing a stereoscopic effect of captured images.

According to the stereoscopic image capturing apparatus 1-1 of the embodiment, not only the physical IADd but also a substantial IAD of the stereoscopic image capturing apparatus can be selected by selecting various parameters such as a focal length f of the objective optical system 10 and an arrangement position of each image forming optical system 20. Further, if the focal length f and the distance L of the objective optical system 10 are set to values satisfying Equation 2, it is possible to make the effective IADed shorter than a physical IADd obtained based on arrangement positions of the image forming optical systems 20R and 20L.

5. Second Embodiment (Example where Variable Focal Point Optical Element is Used in Lens of Objective Optical System And Convergence Position is Adjusted Using Focal Length Varying Function Thereof)

The stereoscopic image capturing apparatus 1-2 according to the second embodiment of the present disclosure will be described with reference to FIGS. 5A and 5B. In FIGS. 5A and 5B, constituent elements corresponding to FIG. 1 or FIGS. 4A and 4B are given the same reference numerals, and detailed description thereof will be omitted. In the stereoscopic image capturing apparatus 1-2, an objective optical system 10-1 includes a convex lens 10-1a and a variable focal point optical element 10-1b. As the variable focal point optical element 10-1b, for example, a liquid lens or the like which alters a refractive index of light using a voltage of flowing electricity may be used.

The imaging unit 2R and the imaging unit 2L are disposed at such a position where the optical axis Ax2R and the optical axis Ax2L of the two imaging units 2R and 2L intersect each other on a formation position of the spatial image S' on the optical axis Ax1 of the objective optical system. In other words, the intersection where the two optical axes Ax2 intersect each other is a convergence point c of the imaging unit 2 including each image forming optical system 20 and the corresponding imaging device 202. In addition, in the stereoscopic image capturing apparatus 1-2 as well, the arrangements of the imaging units 2R and 2L are not limited to the examples shown in FIGS. 5A and 5B. As the arrangement shown in FIG. 3, each optical axis Ax2 of the image forming optical system 20 may be disposed so as to be parallel to the optical axis Ax1 of the objective optical system 10. That is to say, each imaging unit 2 may be disposed such that lines connecting the optical axes Ax2 of the respective image forming optical systems 20 or the primary principal points s of the respective image forming optical systems 20 to the centers of the respective imaging devices 202 intersect each other on the optical axis Ax1 of the objective optical system 10.

Next, a convergence position adjustment operation performed by the stereoscopic image capturing apparatus 1-2 will be described with reference to FIGS. 5A and 5B. In the stereoscopic image capturing apparatus 1-2, a focal length f of the objective optical system 10-1 is varied by varying a curvature of the variable focal point optical element 10-1b, thereby moving a formation position of the spatial image S'. The focal length f of the objective optical system 10-1 is represented as a compsite focal length f of a focal length f1 of the convex lens 10-1a and a focal length f2 of the variable focal point optical element 10-1b. Therefore, the focal length f of the objective optical system 10-1 is expressed by the following Equation 5.

$$\text{Focal length } f = (f1 * f2)/(f1 + f2 - ds) \quad \text{(Equation 5)}$$

In the above Equation, "ds" denotes a distance between the main face of the convex lens 10-1a and the main face of the variable focal point optical element 10-1b.

FIG. 5B shows an example of the case where a curvature radius of the variable focal point optical element 10-1b is varied a little from the state shown in FIG. 5A. If a focal length of the variable focal point optical element 10-1b is denoted by f2' when the curvature is varied, the focal length f2' is shorter than the focal length f2. The focal length f with the convex lens 10-1a is calculated using Equation 5 as described above. Therefore, if the distance ds between the principal points of two lenses is fixed, as the curvature radius of the variable focal point optical element 10-1b becomes smaller (the lens becomes thicker), the composite focal length f of the objective optical system 10-1 is also shortened.

In addition, if the focal length f of the objective optical system 10-1 is shortened, a formation position of the spatial image S' is moved toward the subject S on the optical axis Ax1 of the objective optical system 10-1. Since the arrangements of the imaging units 2R and 2L are fixed and the position of the convergence point c is not moved, a relative position of the spatial image S' with respect to the convergence point c is varied, and thereby the position of the convergence point c on the spatial image S' is varied.

According to the stereoscopic image capturing apparatus 1-2 of the above-described second embodiment, the same effects as the effects achieved by the first embodiment can be achieved. In addition, in the stereoscopic image capturing apparatus 1-2, an image forming position is not varied by moving a lens position, but an image forming position is varied by changing the focal length f of the objective optical system 10-1 through variations in the curvature of the variable focal point optical element 10-1b. That is to say, an absolute amount of "variations" necessary to vary the focal length f is very small as compared with a case of moving a lens position. Therefore, equivalent mass of a working portion for realizing the variations in the focal length f is considerably decreased as compared with the configuration of moving a lens position according to the first embodiment. Thereby, a focus control response frequency can be heightened, and thus it is possible to perform focus variation or convergence position variation at high speed. That is to say, it is possible to track focus and convergence positions even in a subject S which moves fast.

6. Third Embodiment( Example where Convergence Position is Adjusted by Moving Overall Imaging Units)

The stereoscopic image capturing apparatus 1-3 according to the third embodiment of the present disclosure will be described with reference to FIGS. 6A and 6B. A configuration and an arrangement of the stereoscopic image capturing apparatus 1-3 are the same as those in shown in FIG. 1 or FIGS. 4A and 4B. That is to say, the stereoscopic image capturing apparatus 1-3 includes an objective optical system 10 and two imaging units 2R and 2L, and the imaging unit 2R and the imaging unit 2L are disposed at such a position where the optical axis Ax2R and the optical axis Ax2L of the two imaging units 2R and 2L intersect each other on a formation position of the spatial image S' on the optical axis Ax1 of the objective optical system. In other words, the intersection where the two optical axes Ax2 intersect each other is a convergence point c of the imaging unit 2 including each image forming optical system 20 and the corresponding imaging device 202. In addition, in the stereoscopic image capturing apparatus 1-3 as well, as the arrangement shown in FIG. 3, each imaging unit 2 may be disposed such that each optical axis Ax2 of the image forming optical system 20 is parallel to the optical axis Ax1 of the objective optical system 10. That is to say, each imaging unit 2 may be disposed such that lines connecting the optical axes Ax2 of the respective image forming optical systems 20 or the primary principal points s of the respective image forming optical systems 20 to the centers of the respective imaging devices 202 intersect each other on the optical axis Ax1 of the objective optical system 10.

Next, a convergence position adjustment operation performed by the stereoscopic image capturing apparatus 1-3 will be described with reference to FIGS. 6A and 6B. In the embodiment, a formation position of the spatial image S' is varied by moving the whole of each imaging unit 2 in the front and rear directions, and thereby a position of the convergence point c in a subject (spatial image S') is varied. The movement of each imaging unit 2 is performed along a line Ln, passing through the primary principal point sR (sL) of the image forming optical system 20R (20L), parallel to the optical axis Ax1 of the objective optical system 10. The line Ln is denoted by the broken lines in FIGS. 6A and 6B.

If the objective optical system 10 is not moved and is fixed, a position of the spatial image S' is also fixed. In this state, each imaging unit 2 is moved in the front and rear directions by the above-described methods, and thereby a formation position of the convergence point c is also moved so as to track the movement. FIG. 6A shows a state where the convergence point c is formed on the rear side of the spatial image S' (the image forming optical system 20 side). If each imaging unit 2 is moved toward the subject from this state, the formation position of the convergence point c is also moved toward the subject.

According to the third embodiment described above, it is possible to perform the convergence position adjustment operation independently from the focus adjustment operation. In addition, it is possible to perform the convergence position adjustment independently from not only the focus adjustment operation but also other adjustments such as a physical IADd adjustment or zoom adjustment.

In addition, according to the embodiment, it is possible to adjust a convergence position without varying the effective IADed. As the same effects as the effects achieved by the first embodiment, it is possible to achieve the effect of determining the effective IADed by selecting various parameters, and the effect of making the effective IADed shorter than the physical IADd.

In addition, in the stereoscopic image capturing apparatus 1-3, each of the imaging units 2 is constituted by a pan focus (deep focus) camera, and thereby it is not necessary to perform a focus position adjustment operation. With such a configuration, it is possible to further simplify the configuration of the stereoscopic image capturing apparatus 1-3. In addition; if each of the imaging units 2 is constituted by the pan focus (deep focus) camera, a focusing range becomes very wide since photographing is performed in a state where the depth of field is large. Thereby, it is possible to prevent a blurred subject from being fused where focus is not adjusted. In addition, it is possible to achieve an effect that a difference in focus states on the same subject S is not generated in parallax images obtained by the left and right imaging units 2.

7. Fourth Embodiment( Example where Convergence Position is Adjusted by Controlling Orientation of Imaging Units)

The stereoscopic image capturing apparatus 1-4 according to the fourth embodiment of the present disclosure will be described with reference to FIGS. 7A and 7B. A configuration of the stereoscopic image capturing apparatus 1-4 is basically the same as that in shown in FIG. 1. That is to say, the stereoscopic image capturing apparatus 1-4 includes an objective optical system 10 and two imaging units 2R and 2L, and the imaging unit 2R and the imaging unit 2L are disposed at such a position where the optical axis Ax2R and the optical axis Ax2L of the two imaging units 2R and 2L intersect each other on a formation position of the spatial image S' on the optical axis Ax1 of the objective optical system. In other words, the intersection where the two optical axes Ax2 intersect each other is a convergence point c of the imaging unit 2 including each image forming optical system 20 and the corresponding imaging device 202. The convergence point c is set at a position separated from the focal point F of the objective optical system by a distance $\delta$. The primary principal point of each image forming optical system 20 is located at a position separated from the objective optical system focal point F by the distance A on the optical axis Ax1, and is disposed at a position separated from the optical axis Ax1 in the vertical direction by the distance d/2.

A convergence point adjustment by the stereoscopic image capturing apparatus 1-4 is performed by controlling an orientation of the imaging unit 2. Specifically, each camera orientation control unit 212 rotates each imaging unit 2 with respect to the primary principal point s of each image forming optical system 20, thereby adjusting a convergence position. FIG. 7B shows a state where the orientations of the imaging units 2R and 2L are respectively tilted further toward the inside (the optical axis Ax1 of the objective optical system 10 side) than the state shown in FIG. 7A. If each imaging unit 2 is rotated in this way, a formation position of the convergence point c is moved to the rear side from the position shown in FIG. 7A. Along therewith, the distance $\delta$ between the focal point F of the objective optical system 10 and the convergence point c is lengthened.

If a value of the distance $\delta$ is adjusted such that a convergence position is adjusted to an arbitrary point on the spatial image S', it is necessary to control an angle where each imaging unit 2 is rotated. Specifically, the rotation of each imaging unit 2 is controlled such that an angle $\theta'$ formed by the optical axis Ax2 of each image forming optical system 20 and the optical axis Ax1 of the objective optical system 10 is $\theta'$ defined by the above Equation 3 (angle $\theta'=\arctan(d/2(A-\delta))$). In a case where focus is adjusted to the shortest photographing distance, since the distance $\delta$ is increased, the angle $\theta'$ is also increased according to the relationship shown in the above Equation. In a case where focus is adjusted to infinity, since the distance $\delta$ is zero, the angle $\theta'$ is the smallest value.

According to the above-described fourth embodiment, it is possible to achieve the same effects as the effects achieved by the third embodiment. That is to say, it is possible to adjust a convergence position without completely varying the effective IADed. In addition, each of the imaging units 2 is constituted by a pan focus (deep focus) camera, it is possible to vary a convergence position simply by performing a control for varying an orientation of each of the imaging units 2 through rotation of each of the imaging units 2. With such a configuration, as compared with a case where a working portion for varying a convergence position is configured as a linear motion guide mechanism, it is possible to reduce power necessary for driving the working portion. Therefore, since a power consumption amount in the stereoscopic image capturing apparatus 1-4 can be reduced, it is possible to suppress a consumption amount of a battery (not shown) so as to be small.

In addition, the stereoscopic image capturing apparatus 1-4 may be applied to an imaging apparatus having a camera-shake correction function. In this case, it is possible to adjust a convergence position not by physically shifting each imaging device 202 but by electrically shifting a reading range where the imaging device 202 reads an image from the imaging surface.

8. Fifth Embodiment (Example where Positions of Imaging Devices are Shifted with Respect to Lens Position of Image Forming Optical System, and then Convergence Position is Adjusted by Moving Only Positions of Imaging Devices)

The stereoscopic image capturing apparatus 1-5 according to the fifth embodiment will be described with reference to FIGS. 8A and 8B. A correlation function and an arrangement of the stereoscopic image capturing apparatus 1-5 are the same as those shown in FIG. 3. That is to say, the stereoscopic image capturing apparatus 1-5 includes an ideal objective optical system 10 and two imaging units 2R and 2L, and each image forming optical system 20 is disposed at a position where the optical axis Ax2 of each image forming optical system 20 is parallel to the optical axis Ax1 of the objective optical system 10. In addition, an angle of each imaging device 202 is adjusted such that the imaging surface thereof is perpendicular to the optical axis Ax1 of the objective optical system 10. Further, each imaging device 202 is disposed such that a central position of each imaging device 202 is disposed at a position shifted from the optical axis Ax2 of the image forming optical system 20. The shift direction is a deviation from the optical axis Ax1 of the objective optical system 10. A shift amount v of each imaging device 202 is adjusted to such an amount where a straight line connecting the primary principal point s of each image forming optical system 20 to the center of the imaging device 202 intersects the intersection c on the optical axis Ax1 of the objective optical system 10.

Next, the stereoscopic image capturing apparatus 1-5 according to the fifth embodiment will be described with reference to FIGS. 8A and 8B. Controlling the convergence point position is performed by shifting each imaging device 202 for each image forming optical system 20. In other words, as described with reference to FIG. 3, it is possible to vary a formation position of the convergence point c (the distance δ from the focal point F of the objective optical system 10) by varying a shift amount v of each imaging device 202 with respect to the optical axis Ax2 of the image forming optical system 20.

According to the above-described fifth embodiment, it is possible to achieve the same effects as the effects, achieved by the third (fourth) embodiment. In other words, it is possible to adjust a convergence position without completely varying the effective IADed. In addition, according to the embodiment, since a convergence position can be varied simply by varying a position of each imaging device 202, it is possible to decrease equivalent mass of a working portion for varying a convergence position as compared with a case of moving the whole of each imaging unit 2, in the same manner as the example shown in the third embodiment. In other words, since power necessary to drive the working portion can be reduced, it is possible to reduce the power consumption amount in the stereoscopic image capturing apparatus 1-5. Thereby, it is possible to suppress the battery consumption so as to be small.

In addition, according to the above-described fifth embodiment, in the same manner as the second embodiment, it is possible to achieve an effect that focus planes in left and right parallax images are the same as each other. If the focus planes in the left and right parallax images are the same as each other, even in a state with a convergence angle, trapezoidal distortion is not generated in images obtained by the left and right imaging units 2L and 2R. Therefore, it is possible to obtain favorable parallax images without an image process for treating trapezoidal distortion.

9. Sixth Embodiment (Example of Configuration where Convergence Point is Adjusted Using Lens Capable of Varying Convergence Angle, and Focus Position is Adjusted by Moving Positions of Imaging Devices)

The stereoscopic image capturing apparatus 1-6 according to the sixth embodiment will be described with reference to FIGS. 9A to 9C. The stereoscopic image capturing apparatus 1-6 includes an objective optical system 10 having an ideal lens and two imaging units 2Rα and 2Lα. Each imaging unit 2a includes an image forming optical system 20a and an imaging device 202. Each image forming optical system 20 is disposed such that the optical axis Ax2 of each image forming optical system 20 is parallel to the optical axis Ax1 of the objective optical system 10.

The image forming optical system 20R (20L) includes a convergence angle varying lens 204R (204L) formed by a concave lens, and two convex lenses. The convergence angle varying lens 204R (204L) is disposed at a position shifted by a predetermined distance in the vertical direction from the optical axis Ax1 of the objective optical system 10 with respect to the optical axis Ax2 of the image forming optical system 20. The shift direction is a direction deviates from the optical axis Ax1 of the objective optical system 10. The optical axis of the image forming optical system 20 is curved by the convergence angle varying lens 204R (204L), and thereby the optical axis Ax2R of the image forming optical system 20R intersects the optical axis Ax2L of the image forming optical system 20L at the intersection c on the optical axis Ax1 of the objective optical system 10. A shift amount of the convergence angle varying lens 204R (204L) can be set to an arbitrary value.

Next, a convergence position adjustment operation performed by the stereoscopic image capturing apparatus 1-6 will be described with reference to FIGS. 9A to 9C. A curved amount of the optical axis Ax2 of each image forming optical system 20 is proportional to a shift amount of the arrangement position of each convergence angle varying lens 204. In other words, if the arrangement position of each convergence angle varying lens 204 is varied, a curved amount of the optical axis Ax2 of each image forming optical system 20, that is, an angle formed by the optical axis Ax2 of each image forming optical system 20 and the optical axis Ax1 of the objective optical system 10 is varied. If the angle is varied, a formation position of the convergence point c formed at the intersection between the optical axis Ax2R of the image forming optical system 20R and the optical axis Ax2L of the image forming optical system 20L is varied on the optical axis Ax1 of the objective optical system 10. Therefore, in the stereoscopic image capturing apparatus 1-6, by changing the arrangement position of the convergence angle varying lens 204, it is possible to vary a convergence position according to a shift amount thereof.

FIGS. 9A and 9B are diagrams illustrating variations in a position of the convergence angle varying lens 204 on the optical axis Ax2 of each image forming optical system 20 when the convergence angle varying lens 204 of each image forming optical system 20 is shifted. In FIG. 9A, each convergence angle varying lens 204 is disposed at a position which is greatly separated from the optical axis Ax1 of the objective optical system 10 with respect to the optical axis Ax2 of the image forming optical system 20. With such an arrangement, light beams pass through the vicinity of the lower end of the convergence angle varying lens 204 formed by a concave lens, and thus a refractive index of light is increased. Thereby, the optical axes Ax2 of the image forming optical systems 20 intersect the optical axis Ax1 of the objective optical system 10 at the rear side of the spatial image S' (the image forming optical system 20 side).

As shown in FIG. 9B, if the arrangement position of each convergence angle varying lens 204 is shifted in a direction (downward) closer to the optical axis Ax1 of the objective optical system 10, the convergence angle is decreased, and the convergence point c is also formed on the front side (the subject S side) of the spatial image S'. In other words, a position of the convergence angle varying lens 204 is shifted up and down in the vertical direction with respect to the optical axis Ax1 of the objective optical system 10, and thereby it is possible to adjust a formation position of the convergence point c according to a shift amount thereof. In addition, a shift amount of the convergence angle varying lens 204 is adjusted such that a formation position of the convergence point c is in a range where the spatial image S' is formed. That is to say, according to the stereoscopic image capturing apparatus 1-6 of the embodiment, a variable range vr of the convergence point c is the same as a formed length of the spatial image S' in the depth direction.

In addition, in the stereoscopic image capturing apparatus 1-6, each imaging device 202 is disposed at an angle where the imaging surface thereof is perpendicular to the optical axis Ax2 of each image forming optical system 20. For this reason, the focus adjustment can be realized by shifting a position of each imaging device 202 in the front and rear directions on the optical axis Ax2 of the image forming optical system 20. FIG. 9C shows an example of the case where a position of each imaging device 202 is moved to the rear side from the position shown in FIG. 9B. As such, if a position of each imaging device 202 is moved to the rear side, a focus plane fp is also moved to the rear side on the spatial image S'.

According to the sixth embodiment, it is possible to achieve the same effects as the effects achieved by the third to fifth embodiments. In other words, it is possible to adjust a convergence position without changing the effective IADed. In addition, according to the embodiment, Since a convergence position can be adjusted simply by driving the convergence angle varying lens 204, it is possible to reduce equivalent mass of a working portion necessary to adjust a convergence position. In other words, since power necessary to drive the working portion can be reduced, it is possible to reduce power consumption in the stereoscopic image capturing apparatus 1-6. Thereby, it is possible to suppress a battery consumption so as to be small.

In the embodiment, at the time of the focus adjustment, a control is performed such that each imaging device 202 is moved at the same orientation in the same direction. In other words, it is possible to move the left and right imaging devices 202L and 202R integrally. For this reason, the imaging devices 202R and 202L are fixed to the same member, and can be moved so as to be parallel to the optical axis Ax1 of the objective optical system 10 and the optical axis Ax2 of the image forming optical system 20a. Thereby, it is possible to simplify mechanisms of the stereoscopic image capturing apparatus, and the imaging surfaces of the left and right imaging devices 202L and 202R can be also easily maintained on the same plane. Therefore, it is possible to achieve an effect that it is easy to secure reliability in the face of aging and the like.

In addition, in the same manner as the second embodiment or the fifth embodiment, the imaging surface of the imaging device 202 is maintained to be perpendicular to the optical axis Ax1 of the objective optical system 10 and the optical axis Ax2 of the image forming optical system 20, and thus the focus plane fp is also perpendicular to the optical axis Ax1 and the optical axis Ax1. Thereby, the focus planes of left and right parallax images are the same as each other. For this reason, even if photographing is performed even in a state with convergence, trapezoidal distortion is not generated in left and right images obtained by the imaging units 2Rα and 2Lα. Therefore, it is possible to obtain favorable parallax images without particular image processes in subsequent stages.

10. Modified Examples of First to Sixth Embodiments

Figure 10:
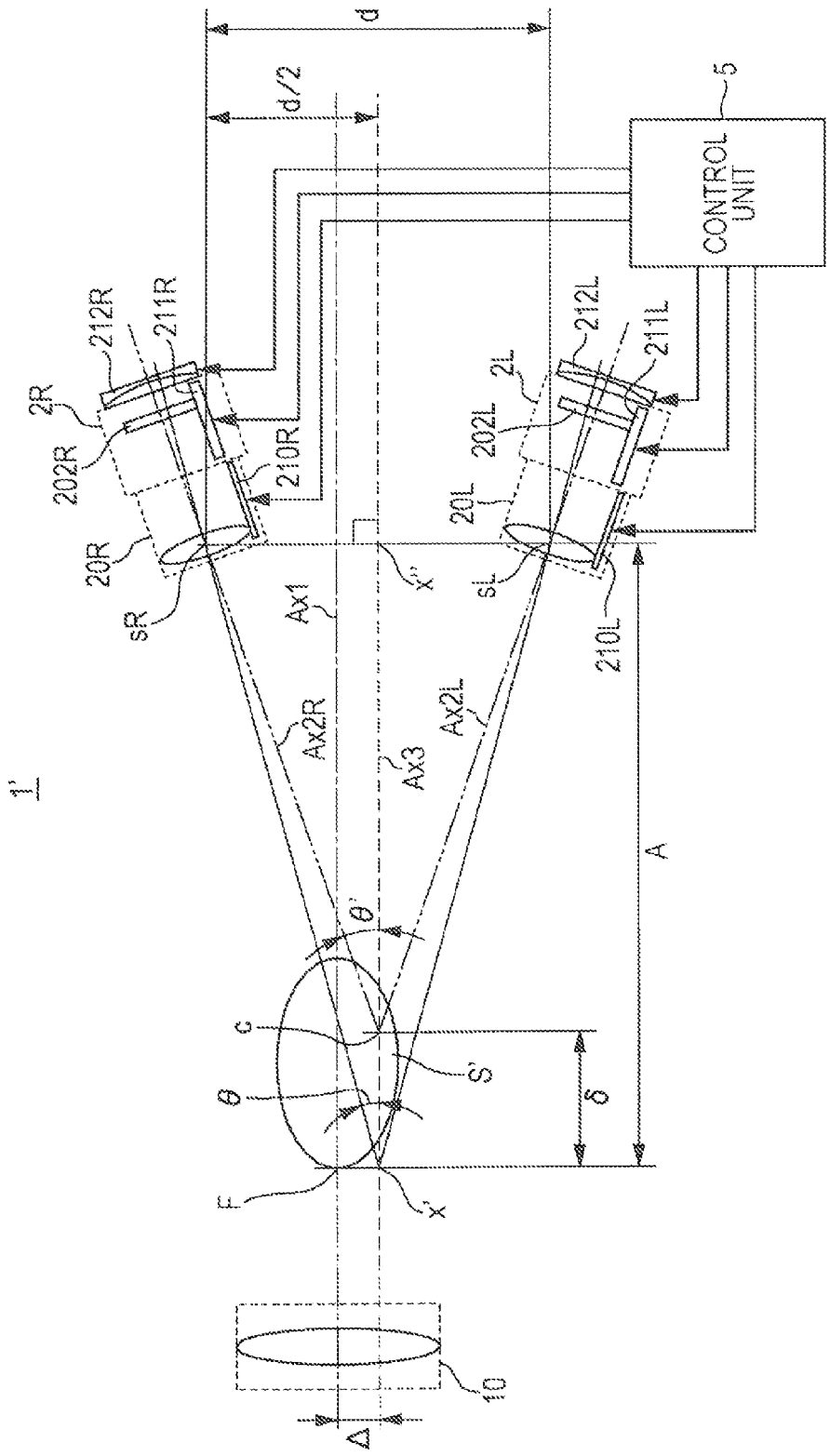
FIG. 10 is a schematic diagram illustrating a configuration example of the stereoscopic image capturing apparatus in a case where a convergence point is set on axes other than the optical axis of the objective optical system according to a modified example of the present disclosure.

Although, in the above-described embodiments, a case where the optical axis Ax2R of the image forming optical system 20R and the optical axis Ax2L of the image forming optical system 20L intersect each other on the optical axis Ax1 of the objective optical system 10 has been exemplified, the present disclosure is not limited thereto. As shown in FIG. 10, a stereoscopic image capturing apparatus 1' may be configured such that the optical axis Ax2R of the image forming optical system 20R and the optical axis Ax2L of the image forming optical system 20L intersect each other on an optical axis Ax3 parallel to the optical axis Ax1 of the objective optical system 10. The optical axis Ax3 is denoted by the long broken lines in FIG. 10. The optical axis Ax3 is assumed to be present a plane containing the primary principal point sR (sL) of the image forming optical system 20R (20L) and the optical axis Ax1 of the objective optical system 10.

In addition, a value of the distance A which is a distance between the optical axis Ax1 of the objective optical system 10 and the optical axis Ax3 is varied depending on a position (up and down positions in a direction perpendicular to the optical axis Ax1) where the convergence point c which is an intersection between the optical axis Ax2R of the image forming optical system 20R and the optical axis Ax2L of the image forming optical system 20L is disposed. In a case where each image forming optical system 20 is disposed such that the optical axis Ax2 of each image forming optical system 20 is parallel to the optical axis Ax3, a point where respective straight lines connecting secondary principal points of the respective image forming optical systems 20 to the centers of the respective imaging devices 202 intersect each other on the optical axis Ax3 is the convergence point c.

If the stereoscopic image capturing apparatus 1' is configured in this way, the arrangement position or the movement of the respective units described in the respective embodiments may be adjusted with respect to the optical axis Ax3. Specifically, the image forming optical systems 20 and/or the imaging devices 202 forming a pair are operated together to perform focus adjustment such that lengths of the respective line segments connecting an intersection x' (second intersection) where a perpendicular (second perpendicular) reaching the optical axis Ax3 from the focal point F of the objective optical system 10 intersects the optical axis Ax3, to the primary principal points s of the respective image forming optical systems 20, are the same as each other.

In addition, in a case of adjusting the focus adjustment by varying an angle θ' formed by the optical axis Ax2R (Ax2L) of the image forming optical systems 20R and 20L and the optical axis Ax3, an orientation of each imaging unit 2, a position of each image forming optical system 20, or a position of each imaging device 202 is adjusted such that the angle θ' satisfies the above Equation 3. Further, in a case where each image forming optical system 20 is disposed such that the optical axis Ax2 of each image forming optical system 20 is parallel to the optical axis Ax3, the angle θ' represents an angle formed by a straight line passing through the primary principal point s of the image forming optical system 20 and the center of the imaging device 202, and the optical axis Ax3.

In FIG. 10, "d" is a distance between lenses of the image forming optical systems 20 forming a pair. Therefore, "d/2" is a length of the perpendicular (third perpendicular) reaching the optical axis Ax3 from the primary principal point sR (sL) of the image forming optical system 20R (20L). In addition, "A" is a length of the line segment connecting an intersection x" (third intersection) which the third perpendicular intersects the optical axis Ax3 to the intersection x'. "δ" is a length of the line segment connecting the convergence point c to the intersection x'

In addition, although, in FIG. 10, an example where the optical axis Ax3 is provided on the plane containing the primary principal point sR (sL) of the image forming optical system 20R (20L) and the optical axis Ax1 of the objective optical system 10 has been described, the present disclosure is not limited thereto. In other words, the optical axis Ax3 may be disposed at such a position where the plane containing the primary principal point sR (sL) of the image forming optical system 20R (20L) and the plane containing the optical axis Ax3 and the optical axis Ax1 of the objective optical system 10 are not the same as each other. That is to say, the optical axis Ax3 may be disposed at any position of 360° with respect to the optical axis Ax1 as long as the optical axis Ax3 is parallel to the optical axis Ax1 of the objective optical system 10.

Figure 11:
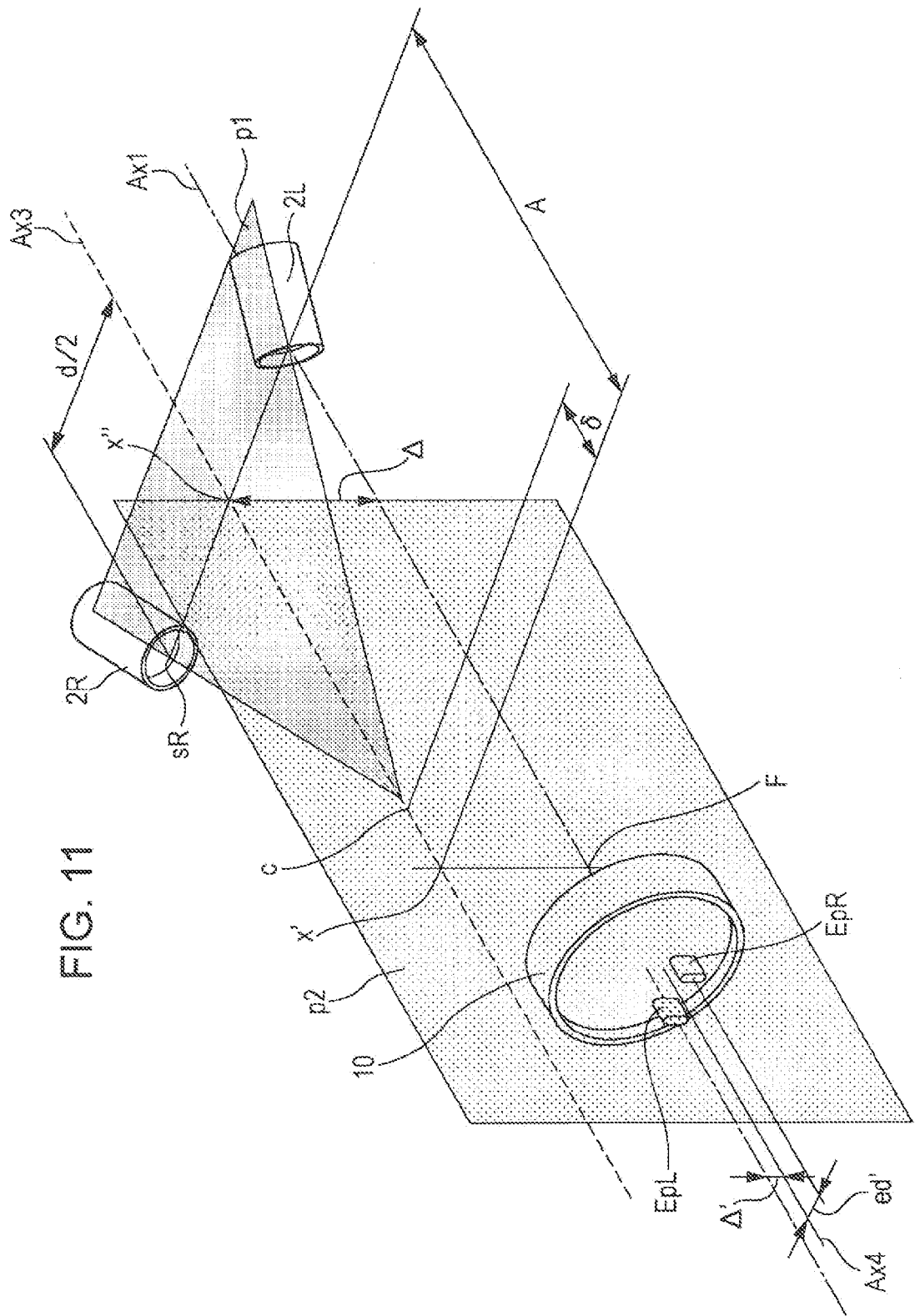
FIG. 11 is a schematic diagram illustrating a configuration example of the stereoscopic image capturing apparatus in a case where a convergence point is set on axes other than the optical axis of the objective optical system according to a modified example of the present disclosure.

FIG. 11 shows an example where the optical axis Ax3 is disposed at such a position where a plane p1 denoted by the triangle containing the primary principal point sR (sL) of the image forming optical system 20R (20L) is perpendicular to a plane p2 containing the optical axis Ax1 of the objective optical system 10 and the optical axis Ax3. In FIG. 11, the imaging units 2R and 2L and the objective optical system 10 are simply shown by cylindrical shapes. In addition, the objective optical system 10 shown in FIG. 11 is assumed to be formed by a convex lens.

In FIG. 11, the optical axis Ax3 is set at a position separated from the optical axis Ax1 of the objective optical system 10 upward in the vertical direction by the distance A. In other words, the image forming optical systems 20R and 20L are disposed such that a convergence point (intersection c) is formed on the optical axis Ax3. If disposed in this way, an effective pupil EpR corresponding to the imaging unit 2R and an effective pupil EpL corresponding to the imaging unit 2L are formed at positions deviated from the optical axis Ax1 of the objective optical system 10 downward in the vertical direction. If an axis formed at a position deviated from the optical axis Ax1 of the objective optical system 10 downward on the plane p2 is an optical axis Ax4 by a distance Δ', for example, the effective pupil EpR corresponding to the imaging unit 2R is formed at a position deviated from the optical axis Ax4 rightward by a distance ed'. Since a case where a convex lens is used in the objective optical system 10 is assumed in the example shown in FIG. 11, positions of the respective effective pupils Ep are opposite to the arrangement positions of the actual imaging units 2R and 2L in the left and right sides with the optical axis Ax4 interposed therebetween.

Figure 12:
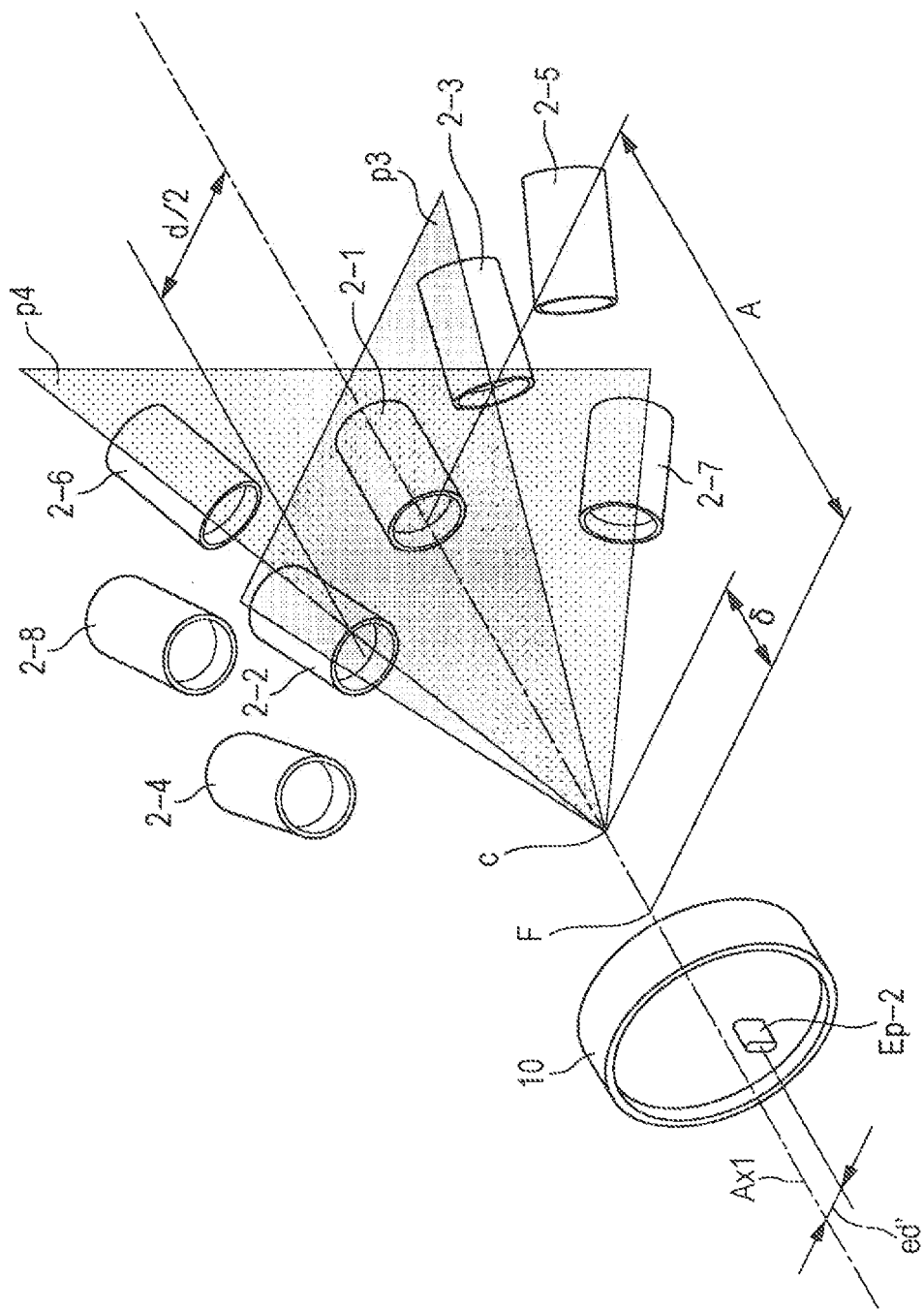
FIG. 12 is a schematic diagram illustrating a configuration example of the stereoscopic image capturing apparatus in a case where a plurality of imaging units are provided according to a modified example of the present disclosure.

In addition, although an example where two imaging units 2 are provided so as to obtain left and right parallax images has been described in the above-described embodiments, the present disclosure is not limited thereto. A configuration where three or more imaging units 2 are used may be employed. FIG. 12 shows an example where eight imaging units 2 are provided. An, imaging unit 2-1 is disposed on the optical axis Ax1 of the objective optical system 10, and an imaging unit 2-2 and an imaging unit 2-3 are disposed at horizontally symmetrical positions with the imaging unit 2-1 interposed therebetween. In addition, an imaging unit 2-4 and an imaging unit 2-5 are disposed outside the imaging unit 2-2 and the imaging unit 2-3 (direction distant from the optical axis Ax1). The primary principal points s of the image forming optical systems 20 of the imaging units 2 are all disposed on the same plane. In other words, the imaging units 2 are disposed on a plane p3 containing the primary principal points s and the convergence point c. In addition, an imaging unit 2-6 and an imaging unit 2-7 are disposed at vertically symmetrical positions with the imaging unit 2-1 interposed therebetween. The principal points s of the imaging unit 2-6 and the imaging unit 2-7 are assumed to be disposed on a plane p4 perpendicular to the plane p3. In addition, an imaging unit 2-8 is disposed at a position which does not belong to the plane p3 or the plane p4 (top left position of the figure).

The arrangements (angles) of the imaging units 2-1 to 2-8 are adjusted to such a position where lines connecting the optical axes Ax2 thereof or the primary principal points to the centers of the imaging devices 202 intersect each other at an intersection (convergence point c). With such an arrangement, for example, an effective pupil Ep-2 corresponding to the imaging unit 2-2 is formed at a position deviated from the optical axis Ax1 of the objective optical system 10 obliquely right-downward by the distance ed'.

In a case where a plurality of imaging units 2 are arranged in this way, when focus adjustment is performed, a control may be performed such that the imaging units 2-2 and 2-3, the imaging units 2-4 and 2-5, and the imaging units 2-6 and 2-7 are respectively operated together.

In addition, in the above-described embodiments, there has been described an example of the case where a control is performed such that the imaging units 2 present at symmetrical positions with the optical axis Ax1 of the objective optical system 10 or the optical axis Ax3 interposed therebetween form a pair, and the respective image forming optical systems 20 of the imaging units 2 and/or the respective imaging devices 202 corresponding thereto are operated together. However, the present disclosure may be applied to a form where a control is performed such that they are not operated together. However, in this case as well, it is necessary to perform focus adjustment such that a ratio of lengths of the perpendicular d/2 and the line segment A is constant. With this control, formation positions of the effective pupils Ep corresponding to the respective imaging units 2 are not varied due to the focus adjustment.

In addition, the present disclosure may employ the following configurations.

(1) A stereoscopic image capturing apparatus including an objective optical system that has a function of forming a subject as a real image or an imaginary image; a plurality of image forming optical systems that respectively form a plurality of subject light beams emitted from different paths of the objective optical system as parallax images again, using a plurality of independent optical systems; a plurality of imaging devices that are installed so as to correspond to the plurality of image forming optical systems and convert the parallax images formed by the plurality of image forming optical system into image signals; and a control unit that adjusts a position of a convergence point formed at a position where optical axes of the plurality of image forming optical systems intersect each other or a position where lines connecting primary principal points of the plurality of image forming optical systems to centers of the imaging devices intersect each other, by varying a relative arrangement position of the objective optical system with respect to arrangement positions of the image forming optical systems and/or the imaging devices, or relative arrangement positions of the image forming optical systems and/or the imaging devices with respect to an arrangement position of the objective optical system, such that a ratio of a focal length of the objective optical system and a distance in an optical axis direction of the objective optical system between a focal point of the objective optical system and a primary principal point of the image forming optical system is substantially constant, in a distance in the optical axis direction of the objective optical system between a secondary principal point of the objective optical system and the primary principal point of the image forming optical system.

(2) The stereoscopic image capturing apparatus set forth in (1), wherein, in a case where a value of the focal length is positive when the objective optical system forms the subject as the real image, and a value of the focal length is negative when the objective optical system forms the subject as the imaginary image, the focal length (f) of the objective optical system and a distance (L) in a horizontal direction between the secondary principal point of the objective optical system and the primary principal point of the image forming optical system are set to values satisfying the following Equation.

$$|f/(L-f)| \leq 1$$

(3) The stereoscopic image capturing apparatus set forth in (1) or (2), wherein the control unit adjusts a formation position of the convergence point by moving the objective optical system in front and rear directions on the optical axis of the objective optical system.

(4) The stereoscopic image capturing apparatus set forth in any one of (1) to (3), wherein the objective optical system includes a plurality of lens groups, and wherein the control unit adjusts the formation position of the convergence point by adjusting positions of all or a portion of the lens groups of the objective optical system.

(5) The stereoscopic image capturing apparatus set forth in (1) or (2), wherein a variable focal point optical element which can vary a focal length is used for a portion of lenses of the objective optical system, and wherein the control unit adjusts the formation position of the convergence point using a focal length varying function of the variable focal point optical element.

(6) The stereoscopic image capturing apparatus set forth in (1) or (2), wherein the control unit adjusts a formation position of the convergence point by rotating an imaging unit including the plurality of image forming optical systems and imaging devices with respect to the primary principal point of the image forming optical system so as to vary the orientation of the imaging unit.

(7) The stereoscopic image capturing apparatus set forth in (6), wherein, if a distance between the lenses of the plurality of image forming optical systems is d; a length of a perpendicular reaching the optical axis of the objective optical system from each primary principal point of the plurality of image forming optical systems is d/2; a length of a line segment connecting an intersection where the perpendicular intersects the optical axis of the objective optical system to the focal point of the objective optical system is A; and a length of a line segment connecting a convergence point formed at a point where the respective optical axes of the image forming optical systems intersect each other on the optical axis of the objective optical system to the focal point of the objective optical system is δ, the control unit controls the rotation of the imaging unit such that an angle θ' formed by the optical axis of each of the image forming optical systems and the optical axis of the objective optical system satisfies the following Equation.

$$\text{Angle } \theta' = \arctan(d/2(A-\delta))$$

(8) The stereoscopic image capturing apparatus set forth in (6), wherein the plurality of image forming optical systems are disposed such that the optical axes of the plurality of image forming optical systems intersect each other on an axis provided at a predetermined position parallel to the optical axis of the objective optical system, and wherein, if a distance between the lenses of the plurality of image forming optical systems is d; a length of a line segment connecting a convergence point formed at a point where the respective optical axes of the image forming optical systems intersect each other on the axis to a second intersection which is an intersection between a second perpendicular reaching the axis from the focal point of the objective optical system and the axis is δ; a length of a third perpendicular reaching the axis from each of the primary principal points of the plurality of image forming optical systems is d/2; and a length of a line segment connecting the second intersection to a third intersection which is an intersection between the third perpendicular and the axis is A, the control unit controls the rotation of the imaging unit such that an angle θ' formed by the optical axis of each of the image forming optical systems and the optical axis of the objective optical system satisfies the following Equation.

$$\text{Angle } \theta' = \arctan(d/2(A-\delta))$$

(9) The stereoscopic image capturing apparatus set forth in (1) or (2), wherein the plurality of image forming optical systems are disposed such that the optical axes thereof are parallel to the optical axis of the objective optical system, and the plurality of imaging devices are disposed at positions shifted from the optical axes of the image forming optical systems by a predetermined amount, at an angle where imaging surfaces thereof are perpendicular to the optical axis of the objective optical system, wherein the control unit adjusts a formation position of the convergence point by moving the position of the imaging device in a direction perpendicular to the optical axis of the image forming optical system.

(10) The stereoscopic image capturing apparatus set forth in (1) or (2), wherein a concave lens is used as one of lenses of each image forming optical system, and wherein the control unit adjusts a formation position of the convergence point by moving the concave lens in a direction perpendicular to the optical axis of the objective optical system.

The present disclosure contains subject matter related to that disclosed in Japanese Priority Patent Application JP 2011-039557 filed in the Japan Patent Office on Feb. 25, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A stereoscopic image capturing apparatus comprising:
an objective optical system that has a function of forming a subject as a real image or an imaginary image;
a plurality of image forming optical systems that respectively form a plurality of subject light beams emitted from different paths of the objective optical system as parallax images again, using a plurality of independent optical systems;
a plurality of imaging devices that are installed so as to correspond to the plurality of image forming optical systems and convert the parallax images formed by the plurality of image forming optical system into image signals; and
a control unit that adjusts a position of a convergence point formed at a position where optical axes of the plurality of image forming optical systems intersect each other or a position where lines connecting primary principal points of the plurality of image forming optical systems to centers of the imaging devices intersect each other, by varying a relative arrangement position of the objective optical system with respect to arrangement positions of the image forming optical systems and/or the imaging devices, or relative arrangement positions of the image forming optical systems and/or the imaging devices with respect to an arrangement position of the objective optical system, such that a ratio of a focal length of the objective optical system and a distance in an optical axis direction of the objective optical system between a focal point of the objective optical system and a primary principal point of the image forming optical system is substantially constant, in a distance in the optical axis direction of the objective optical system between a secondary principal point of the objective optical system and the primary principal point of the image forming optical system.

2. The stereoscopic image capturing apparatus according to claim 1, wherein, in a case where a value of the focal length is positive when the objective optical system forms the subject as the real image, and a value of the focal length is negative when the objective optical system forms the subject as the imaginary image, the focal length (f) of the objective optical system and a distance (L) in a horizontal direction between the secondary principal point of the objective optical system and the primary principal point of the image forming optical system are set to values satisfying the following Equation $|f/(L-f)| \leq 1.$ 3. The stereoscopic image capturing apparatus according to claim 2, wherein the control unit adjusts a formation position of the convergence point by moving the objective optical system in front and rear directions on the optical axis of the objective optical system.

4. The stereoscopic image capturing apparatus according to claim 3, wherein
the objective optical system includes a plurality of lens groups, and
the control unit adjusts formation position of the convergence point by adjusting positions of all or a portion of the lens groups of the objective optical system.

5. The stereoscopic image capturing apparatus according to claim 2, wherein
a variable focal point optical element which can vary a focal length is used for a portion of lenses of the objective optical system, and
the control unit adjusts a formation position of the convergence point using a focal length varying function of the variable focal point optical element.

6. The stereoscopic image capturing apparatus according to claim 2, wherein the control unit adjusts a formation position of the convergence point by rotating an imaging unit including the plurality of image forming optical systems and imaging devices with respect to the primary principal point of the image forming optical system so as to vary an orientation of the imaging unit.

7. The stereoscopic image capturing apparatus according to claim 6, wherein, if a distance between the lenses of the plurality of image forming optical systems is d; a length of a perpendicular reaching the optical axis of the objective optical system from each primary principal point of the plurality of image forming optical systems is d/2; a length of a line segment connecting an intersection where the perpendicular intersects the focal point of the objective optical system to the optical axis of the objective optical system is A; and a length of a line segment connecting a convergence point formed at a point where the respective optical axes of the image forming optical systems intersect each other on the optical axis of the objective optical system to the focal point of the objective optical system is δ, the control unit controls the rotation of the imaging unit such that an angle θ' formed by the optical axis of each of the image forming optical systems and the optical axis of the objective optical system satisfies the following Equation Angle $\theta'=\arctan(d/2(A-\delta))$.

8. The stereoscopic image capturing apparatus according to claim 6,
wherein the plurality of image forming optical systems are disposed such that the optical axes of the plurality of image forming optical systems intersect each other on an axis provided at a predetermined position parallel to the optical axis of the objective optical system, and
wherein, if a distance between the lenses of the plurality of image forming optical systems is d; a length of a line segment connecting a convergence point formed at a point where the respective optical axes of the image forming optical systems intersect each other on the axis to a second intersection which is an intersection between a second perpendicular reaching the axis from the focal point of the objective optical system and the axis is δ; a length of a third perpendicular reaching the axis from each of the primary principal points of the plurality of image forming optical systems is d/2; and a length of a line segment connecting the second intersection to a third intersection which is an intersection between the third perpendicular and the axis is A, the control unit controls the rotation of the imaging unit such that an angle θ' formed by the optical axis of each of the image forming optical systems and the optical axis of the objective optical system satisfies the following Equation Angle $\theta' \arctan(d/2(A-\delta))$.

9. The stereoscopic image capturing apparatus according to claim 2,
wherein the plurality of image forming optical systems are disposed such that the optical axes thereof are parallel to the optical axis of the objective optical system, and the plurality of imaging devices are disposed at positions shifted from the optical axes of the image forming optical systems by a predetermined amount, at an angle where imaging surfaces thereof are perpendicular to the optical axis of the objective optical system, wherein the control unit adjusts a formation position of the convergence point by moving the position of the imaging device in a direction perpendicular to the optical axis of the image forming optical system.

10. The stereoscopic image capturing apparatus according to claim 2, wherein a concave lens is used as one of lenses of each image forming optical system, and the control unit adjusts a formation position of the convergence point by moving the concave lens in a direction perpendicular to the optical axis of the objective optical system.

* * * * *